US011509587B2

(12) United States Patent
Narula et al.

(10) Patent No.: US 11,509,587 B2
(45) Date of Patent: Nov. 22, 2022

(54) MULTIPLE QOS TRAFFIC SPLITTING OVER MULTIPLE HETEROGENEOUS LINKS

(71) Applicant: Dell Products L.P., Round Rock, TX (US)

(72) Inventors: Harpreet S. Narula, Austin, TX (US); Liam B. Quinn, Austin, TX (US); Minho Cheong, Round Rock, TX (US); Dileep Kumar Soma, Round Rock, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/168,298

(22) Filed: Feb. 5, 2021

(65) Prior Publication Data

US 2022/0255865 A1 Aug. 11, 2022

(51) Int. Cl.
*G06F 15/173* (2006.01)
*H04L 47/24* (2022.01)
*H04L 67/104* (2022.01)

(52) U.S. Cl.
CPC ............ *H04L 47/24* (2013.01); *H04L 67/104* (2013.01)

(58) Field of Classification Search
CPC .............................. H04L 47/24; H04L 67/104
See application file for complete search history.

(56) References Cited

U.S. PATENT DOCUMENTS

| 2007/0206550 | A1* | 9/2007 | Zaki ................... H04W 48/08 370/338 |
| 2010/0208609 | A1* | 8/2010 | Sundarraman ........ H04W 28/02 370/252 |
| 2013/0170350 | A1* | 7/2013 | Sarkar ................. H04L 47/2458 370/235 |
| 2015/0295836 | A1* | 10/2015 | Welin ................... H04W 56/00 370/350 |
| 2021/0120454 | A1* | 4/2021 | Chennichetty ........ H04L 5/0007 |
| 2021/0234834 | A1* | 7/2021 | Koshy ................. H04L 63/0272 |
| 2021/0314820 | A1* | 10/2021 | Schliwa-Bertling ........ H04W 28/24 |
| 2022/0045958 | A1* | 2/2022 | Krishnamurthy ... H04L 41/0806 |
| 2022/0141703 | A1* | 5/2022 | Dhammawat ......... H04W 76/34 370/328 |
| 2022/0200948 | A1* | 6/2022 | Gundavelli ........... H04W 24/04 |
| 2022/0239578 | A1* | 7/2022 | Raleigh ............... H04L 41/0893 |

* cited by examiner

*Primary Examiner* — Oleg Survillo
(74) *Attorney, Agent, or Firm* — Terrile, Cannatti & Chambers; Stephen A. Terrile

(57) ABSTRACT

A system, method, and computer-readable medium are disclosed for performing an intelligent connectivity operation. The intelligent connectivity operation includes: identifying a plurality of quality parameters associated with respective network traffic types of an application, each respective network traffic type having an associated traffic stream; constructing a preference mapping, the preference mapping being based upon the plurality of quality parameters associated with the respective aspects of the application; identifying a best-suited network link for each of the traffic streams, the determining using the preference mapping; and, assigning each network traffic stream to a particular network link based upon the identifying the best-suited network link for each of the traffic streams.

20 Claims, 13 Drawing Sheets

MULTIPLE QOS TRAFFIC SPLITTING OVER MULTIPLE HETEROGENEOUS LINKS

BACKGROUND OF THE INVENTION

Field of the Invention

The present invention relates to information handling systems. More specifically, embodiments of the invention relate to performing a network traffic routing operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing an intelligent connectivity operation, comprising: identifying a plurality of quality parameters associated with respective network traffic types of an application, each respective network traffic type having an associated traffic stream; constructing a preference mapping, the preference mapping being based upon the plurality of quality parameters associated with the respective aspects of the application; identifying a best-suited network link for each of the traffic streams, the determining using the preference mapping; and, assigning each network traffic stream to a particular network link based upon the identifying the best-suited network link for each of the traffic streams.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: identifying a plurality of quality parameters associated with respective network traffic types of an application, each respective network traffic type having an associated traffic stream; constructing a preference mapping, the preference mapping being based upon the plurality of quality parameters associated with the respective aspects of the application; identifying a best-suited network link for each of the traffic streams, the determining using the preference mapping; and, assigning each network traffic stream to a particular network link based upon the identifying the best-suited network link for each of the traffic streams.

In another embodiment the invention relates to a computer-readable storage medium embodying computer program code, the computer program code comprising computer executable instructions configured for: identifying a plurality of quality parameters associated with respective network traffic types of an application, each respective network traffic type having an associated traffic stream; constructing a preference mapping, the preference mapping being based upon the plurality of quality parameters associated with the respective aspects of the application; identifying a best-suited network link for each of the traffic streams, the determining using the preference mapping; and, assigning each network traffic stream to a particular network link based upon the identifying the best-suited network link for each of the traffic streams.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
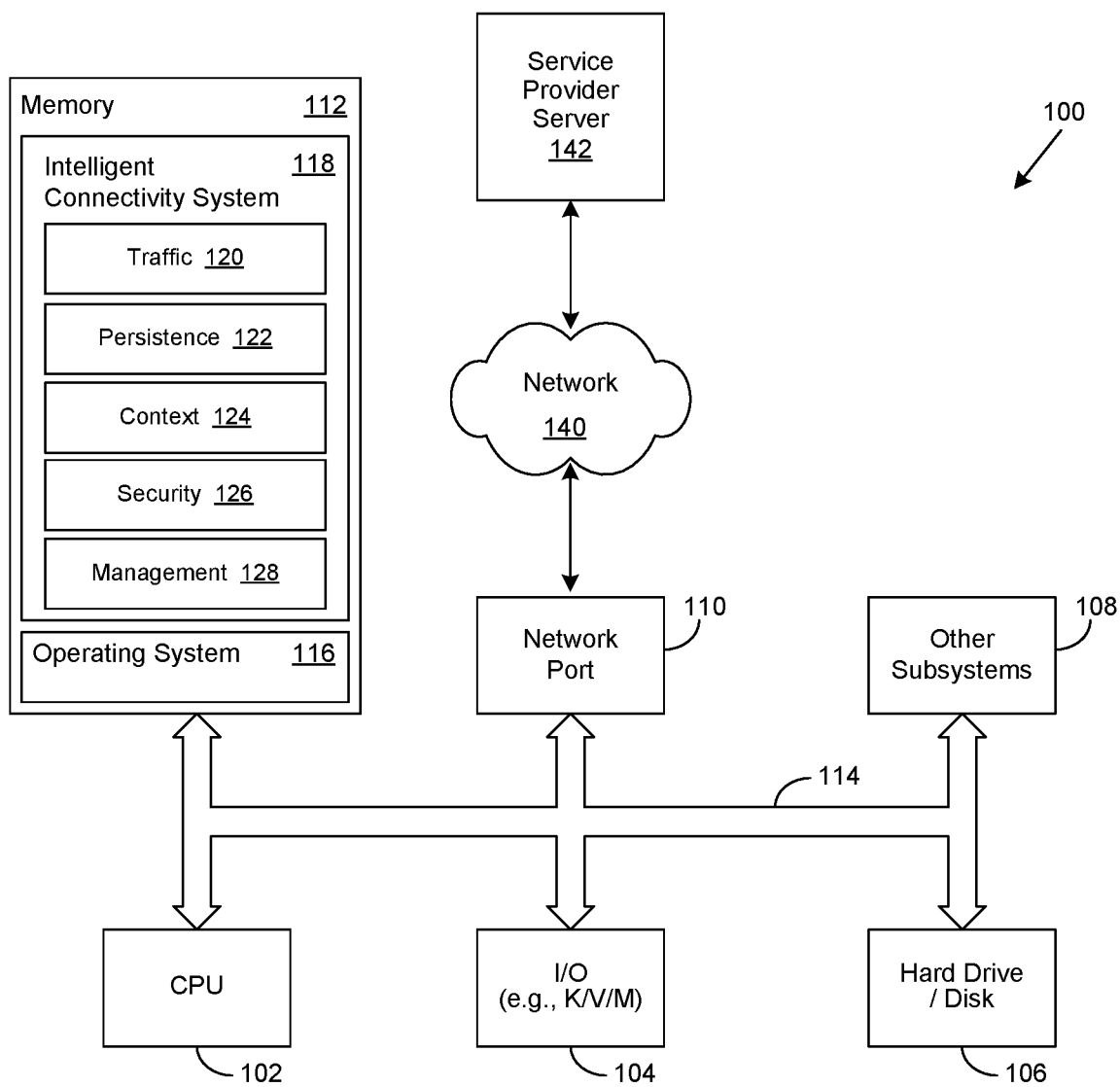
FIG. 1 shows a general illustration of components of an information handling system as implemented in the system and method of the present invention.

A system, method, and computer-readable medium are disclosed for performing a network traffic routing operation. Certain aspects of the invention reflect an appreciation that there is an increasing need to seamlessly, efficiently, responsively, reliably, and securely get data from where it may be stored or generated to where it is needed, whether that be in a data center, in the cloud, on the network edge, or a combination thereof. Certain aspects of the invention likewise reflect an appreciation that there is a growing proliferation of network-enabled devices (i.e., devices that can connect to a network through a network link) and network connectivity options. These network connectivity options include Personal Area Networks (PANs), such as Bluetooth, Wireless Local Area Networks (WLANs), such as Wireless Fidelity (WiFi) networks, Wireless Wide Area Networks (WWANs), such as 3G, 4G, and 5G cellular networks, satellite networks, and wired networks, such as traditional LANs, and Wide Area Networks (WANs), such as the Internet.

Certain aspects of the invention reflect an appreciation that today's network-enabled productivity, collaboration, work, and entertainment activities are increasingly occurring anywhere and at any time. Likewise, certain aspects of the invention reflect an appreciation that such activities are becoming a part of everyday life, and as a result, are leading to an increased expectation of seamless, efficient, responsive, reliable, and secure network connectivity wherever and whenever needed. Certain aspects of the invention reflect an appreciation that users have likewise come to expect the benefits of such network connectivity, regardless of the underlying technology that may be used to provide it.

Certain aspects of the invention reflect an appreciation that many of today's network-enabled user devices are capable of supporting multiple types of network links. Various aspects of the invention likewise reflect an appreciation that certain such network-enabled user devices are further capable of seamlessly switching from one type of network link to another, typically based upon their respective signal strength, levels of congestion, and so forth. Likewise, certain of these multi-link, network-enabled user devices are also capable of simultaneously supporting network traffic by combining two or more types of heterogeneous network links (e.g., WLAN, WWAN, WAN, etc.). However, various aspects of the invention likewise reflect an appreciation that current known approaches for combining two or more types of heterogeneous network links to support concurrent streams of network traffic are unable to assign a particular stream of network traffic to a particular network link according to certain Quality of Service (QoS) parameters.

Skilled practitioners of the art will be familiar with QoS, which as commonly used refers to the description or measurement of the overall performance of a service, such as a telephony network, a computer network, or a cloud computing service. Those of skill in the art will likewise be aware that such description or measurement of QoS network performance may include the service's latency, reliability, throughput, and preferences for different network packet types. Furthermore, such QoS performance for a particular network link may change dynamically over a particular period of time (e.g., 10 ms, 10 seconds, one minute, and so forth). Accordingly, various aspects of the invention reflect an appreciation that it may be advantageous to assign certain streams of network traffic to certain network links, in parallel, according to the respective QoS requirements of each network traffic stream and the QoS capabilities of each network link. Certain aspects of the invention reflect an appreciation that it may likewise be advantageous to perform such assignment deterministically and dynamically, whether individual streams of network traffic are associated with the same application, or not.

As an example, online gaming typically involves two types of network traffic (i.e., network traffic type), the first for input/out (I/O) control, and the second for video streaming. In this example, QoS attributes for I/O control network traffic typically include very low latency (e.g., <10 ms) and relatively low throughput (e.g. 1 Mbps), which are generally associated with the operational capabilities of a WWAN. Likewise, QoS attributes for video streaming network traffic typically include moderate latency (<50 ms) and high throughput (e.g., 100 Mbps), which are generally associated with the operational capabilities of a WLAN.

To continue the example, while the operational capabilities of a particular WWAN link may satisfy the QoS parameters for I/O control network traffic, it may not satisfy the QoS parameters for video streaming network traffic. Likewise, while the operational capabilities of a particular WLAN link may satisfy the QoS parameters for video streaming network traffic, it may not satisfy the QoS parameters for I/O control network traffic. Accordingly, it would be advantageous in this example to concurrently route the I/O control network traffic stream to a WWAN link and the video streaming network traffic stream to a WLAN link. By doing so, the respective QoS parameters of both the I/O control and video streaming network traffic streams may be met.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise an intelligent connectivity system 118. In one embodiment, the information handling system 100 is able to download the intelligent connectivity system 118 from the service provider server 142. In another embodiment, the intelligent connectivity system 118 is provided as a service from the service provider server 142.

In certain embodiments, the intelligent connectivity system 118 may be implemented to include a traffic component 120, a persistence component 122, a context component 124, a security component 126, and a management component 128, or a combination thereof, as described in greater detail herein. In certain embodiments, the intelligent connectivity system 118 may be implemented to perform an intelligent connectivity operation, described in greater detail herein. In certain embodiments, the intelligent connectivity operation may be performed by the intelligent connectivity system 118 during operation of an information handling system 100. In certain embodiments, the performance of the intelligent connectivity operation may result in the realization of improved network connectivity for the information handling system 100.

Figure 2:
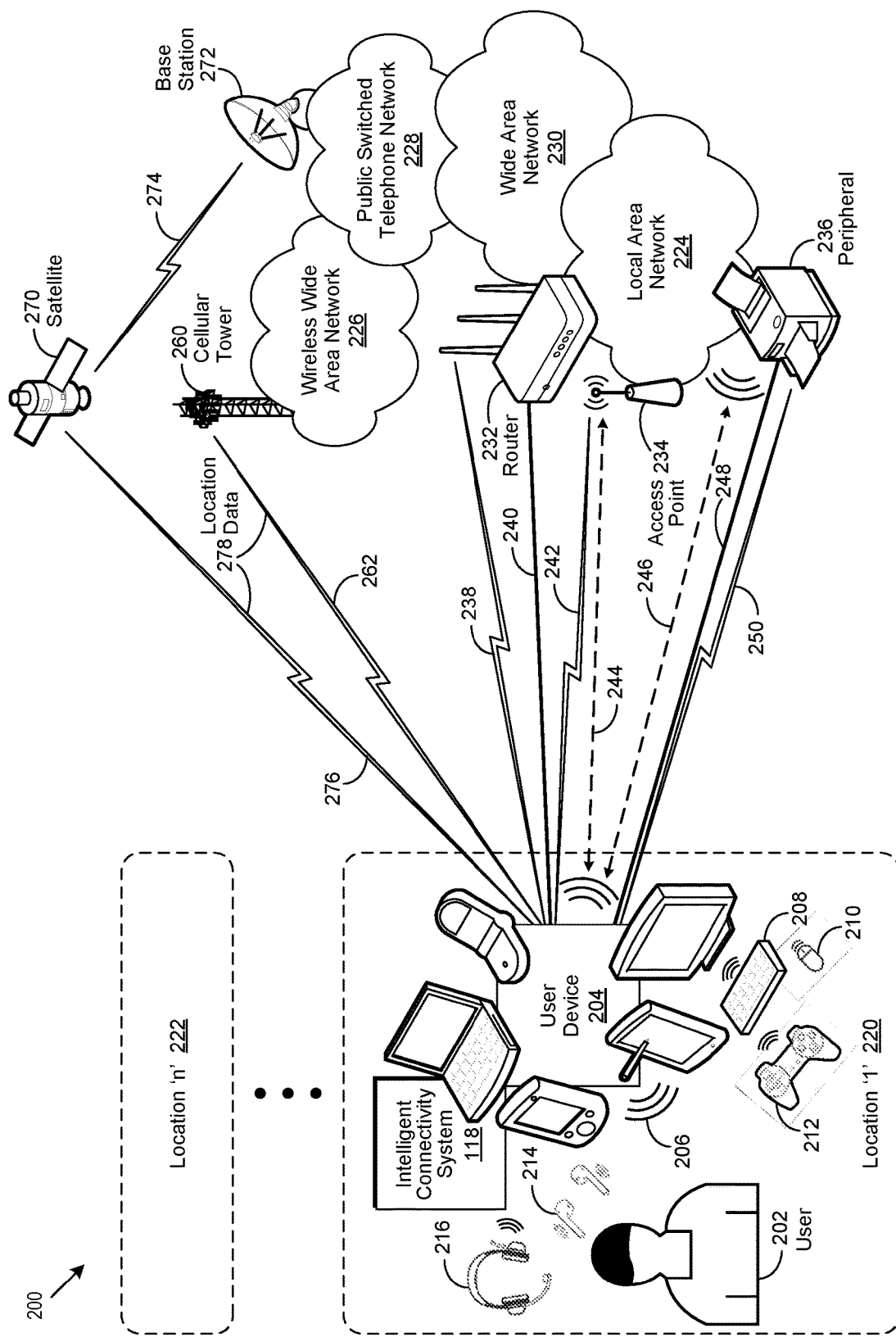
FIG. 2 is a block diagram of an intelligent connectivity environment.

FIG. 2 is a block diagram of an intelligent connectivity environment implemented in accordance with an embodiment of the invention. In certain embodiments, the intelligent connectivity environment 200 may include an intelligent connectivity system 118, described in greater detail herein. In certain embodiments, the intelligent connectivity system 118 may be implemented on a user device 204. As used herein, a user device 204 broadly refers to an information handling system such as a personal computer, a laptop computer, a tablet computer, a personal digital assistant (PDA), a smart phone, a mobile telephone, or other device that is capable of communicating and processing data. In certain embodiments, a user 202 may use the user device 204 to interact with the intelligent connectivity system 118.

In certain embodiments, the intelligent connectivity environment 200 may include a Local Area Network (LAN) 224, a Personal Area Network (PAN) 206, a Wireless Local Area Network (WLAN), a Wireless Wide Area Network (WWAN) 226, a satellite 270 network, the public switched telephone network (PSTN) 228, and a Wide Area Network (WAN) 230, such as the Internet, or a combination thereof. In certain embodiments, the LAN 224 may be based upon one or more protocols, such as Ethernet, Asynchronous Transfer Mode (ATM), Token Ring, or Fiber Distributed Data Interface (FDDI). In certain embodiments, the PAN may be based upon one or more protocols commonly associated with Bluetooth, ZigBee, or ultrawideband (UWB). In certain embodiments, the WLAN may be based upon one or more variants of the IEEE 802.11 wireless communication standard. In certain embodiments, the WWAN 226 may be based upon one or more generations of known cellular network protocols, commonly referred to as 3G, 4G, 5G, and so forth. In certain embodiments, the WAN 230 may be based upon one or more protocols, such as X.25, Frame Relay, Asynchronous Transfer Mode (ATM), or Telecommunications Protocol/Internet Protocol (TCP/IP).

In certain embodiments, the user device 204 may be implemented with communication hardware and software that allows it to communicate with one or more wirelessly-enabled input/output (I/O) devices via a PAN 206 network link. Examples of such wirelessly-enabled I/O devices include a keyboard 208, a mouse 210, a game controller 212, earphones or earbuds 214, a headset 216, and so forth. Skilled practitioners of the art will be familiar with a network link, which as commonly used, refers to the physical and logical network component used to interconnect hosts or nodes in a network. Those of skill in the art will likewise be aware that such network links are generally established through the link layer of a telecommunications protocol stack, such as the Internet protocol suite or the Open Systems Interconnection (OSI) model. As typically implemented, the link layer refers to a group of methods and communications protocols confined to the network link that a host, such as a particular user device 204 is physically connected to.

In certain embodiments, the user device 204 may be implemented with communication hardware and software that allows it to communicate with one or more access points 234 via a PAN 244 network link, or a WLAN 244 network link, or both. Skilled practitioners of the art will be familiar with a wireless access point (AP) 234, which generally refers to a networking hardware device that allows a wirelessly-enabled device, such as a particular user device 204, to connect to a wired network, such as a LAN 224. In various embodiments, the AP 234 may be implemented as a stand-alone device. In certain of these embodiments, the AP 234 may be implemented to connect to a router 232 through a LAN 224. In certain embodiments, the functionality of an AP 234 may be implemented as an integral component of the router 232.

In certain embodiments, the user device 204 may be implemented with communication hardware and software that allows it to communicate with one or more peripherals 236 via a PAN 246 network link, a LAN 248 network link, or a WLAN 250 network link, or a combination thereof. In certain embodiments, the user device 204 may be implemented with communication hardware and software that allows it to communicate with one or more routers 232 via a LAN 240 network link, or a WLAN 238 network link, or both. In certain embodiments, the user device 204 may be implemented with communication hardware and software that allows it to communicate with one or more WWAN 226 cellular towers 260 via a WWAN 262 network link. In certain embodiments, the user device 204 may be implemented with communication hardware and software that allows it to communicate with one or more satellites 270 via a satellite 276 network link.

In various embodiments, a particular cellular tower 260, or a particular satellite 270, or a combination of the two, may be implemented, individually or in combination, to provide certain location data 278, familiar to those of skill in the art, to the user device 204. In certain embodiments, the user device 204 may be configured to receive such location data 278, which is used as a data source for determining the user device's 204 location '1' 220 through 'n' 222. In certain embodiments, the location data 278 may include Global Position System (GPS) data provided by a GPS satellite 270. In certain embodiments (not shown), the location data 278 may include various Internet Protocol (IP) or other network address information assigned to the user device 204. In certain embodiments (not shown), the location data 278 may likewise be provided by a router 232, or an AP 234, or both.

In certain embodiments, one or more satellites 270 may be implemented to use known satellite communication protocols to establish a satellite network link 274 to a base station 272. In various embodiments, the base station 272 may in turn be implemented to be connected to the PSTN 228, which in certain embodiments may likewise be implemented to be connected to one or more WWANs 230, or one or more WANs 230, or a combination thereof. In various embodiments, one or more LANs 224 may be implemented to be connected to one or more WANs 230, or a combination thereof. In certain of these embodiments, one or more routers 232, may be implemented, individually or in combination, to connect a particular LAN 224 to a particular WAN 230.

In various embodiments, the intelligent connectivity system 118 may be implemented to establish a particular network link 206, 238, 240, 242, 244, 246, 248, 250, 262, 276, as the user device 204 moves from location '1' 220 to location 'n' 222. In certain of these embodiments, the establishment of a particular network link 206, 238, 240, 242, 244, 246, 248, 250, 262, 276, may be based upon the availability of connectivity to a corresponding network. In various embodiments, the intelligent connectivity system 118 may be implemented to switch from one network link 206, 238, 240, 242, 244, 246, 248, 250, 262, 276 to another. In certain of these embodiments, such switching may be based upon the respective signal strength, available bandwidth, network latency, or a combination thereof, associated with the availability of connectivity to a corresponding network.

In certain embodiments, the intelligent connectivity system 118 may be implemented to switch from one network link 206, 238, 240, 242, 244, 246, 248, 250, 262, 276 to another according to the user device 204 being present at a particular location '1' 220 through 'n' 222. In various embodiments, the intelligent connectivity system 118 may be implemented to establish two or more simultaneous network links 206, 238, 240, 242, 244, 246, 248, 250, 262, 276. In certain of these embodiments, bandwidth respectively corresponding to the two or more network links 206, 238, 240, 242, 244, 246, 248, 250, 262, 276, may be combined to provide aggregated network link bandwidth for use by the user device.

In various embodiments, the intelligent connectivity system 118 may be implemented to assign network connectivity corresponding to a particular software application, or a user device 204 process, to a particular network link 206, 238, 240, 242, 244, 246, 248, 250, 262, 276. In certain embodiments, the intelligent connectivity system 118 may be implemented to respectively assign two or more software applications, or user device 204 processes, to two or more network links 206, 238, 240, 242, 244, 246, 248, 250, 262, 276, according to their corresponding attributes. For example, the intelligent connectivity system 118 may be implemented to assign a wireless-enabled gaming controller 212 to a PAN 206 link, while information generated and received by a game executing on the user device 204 may be assigned to WLAN 238 network link.

In certain of these embodiments, the respective assignment of two or more software applications, or user device 204 processes, or a combination thereof, to two or more network links 206, 238, 240, 242, 244, 246, 248, 250, 262, 276, may be according to the user device 204 being present at a particular location '1' 220 through 'n' 222. As an example, only a lower-speed (e.g., 300 Mbps) WLAN 238 network link may be available at location '1' 220, but both a high-speed (e.g., 100 Gbps) LAN 240 network link and a higher-speed (e.g., 1.7 Gbps) WLAN 238 network link may be available at location 'n' 222. In this example, the user 202 may wish to play a particular online game while simultaneously conducting an online chat session, whether they are at location '1' 220 or 'n' 222. To continue the example, it is possible that the bandwidth of the WLAN 238 network link at location '1' 220 may be barely adequate to support the network connectivity needs of the on-line game. As a result, the additional overhead of network traffic associated with the online chat session may result in the game not performing as responsively as desired.

However, the intelligent connectivity system 118 may be implemented to respectively assign the online chat session to the higher-speed WLAN 238 network link and the online game to the high-speed LAN 240 network link available at location 'n' 222. Accordingly, responsiveness of the online game will likely be improved due to the 100 Gbps speed provided by the LAN 238 network link available at location 'n' 220, while the online chat session will be adequately supported by the 1.7 Gbps speed of the WLAN 240 network link. Skilled practitioners of the art will recognize that many such embodiments and examples are possible. Accordingly, the foregoing is not intended to limit the spirit, scope or intent of the invention.

In certain embodiments, the intelligent connectivity system 118 may be implemented to establish and manage one or more virtual private network (VPN) connections on one or more corresponding network links. Skilled practitioners of the art will be familiar with a VPN, which as typically implemented, uses known tunneling protocols to extend a private network, such as a private LAN 224, across a public WAN 230, such as the Internet, to enable users 202 to use their user devices 204 to send and receive data as to and from an external resource, such as a remote server, as if it was directly connected to the private network. Certain embodiments of the invention reflect an appreciation that a single VPN may not always be sufficient for a particular operational mode, described in greater detail herein.

Accordingly, in certain embodiments, the intelligent connectivity system 118 may likewise be implemented to perform a multi-link network traffic routing operation. As used herein, a multi-link traffic routing operation broadly refers to any operation performed to route network traffic across two or more network links, as described in greater detail herein. In various embodiments, as described in greater detail herein, a multi-link traffic operation may be performed to perform a many-to-many mapping of a plurality of VPN connection to a corresponding plurality of network links. In certain of these embodiments, the many-to-many mapping may be optimized for a particular multi-link configuration. As used herein, as it relates to a many-to-many mapping of a plurality of VPN connection to a corresponding plurality of network links, optimized broadly refers to using certain network link attributes (e.g., available bandwidth, congestion, latency, signal strength, supported protocols, etc.) to determine which network link is best suited for the assignment of a particular VPN.

In certain embodiments, multi-link traffic operations are begun by identifying simultaneously operating VPNs. In various embodiments, the intelligent connectivity system 118 may be implemented to perform certain operations to identify such simultaneously operating VPNs. The configuration policy respectively associated with each identified VPN is then determined. In various embodiments, the configuration policy may be implemented to contain certain information associated with the type of network link supported, the type of traffic that may be routed by each, and so forth, for each VPN.

A network filter driver (NFD), described in greater detail herein, is then used to create n+1 first-in, first-out (FIFO) network traffic queues, where 'n' is defined as the number of previously identified VPNs. Thereafter, a network tunnel indication is created for each identified VPN when it is initiated. In certain embodiments, the network tunnel indication may be implemented as a network tunnel pointer, familiar to those of skill in the art. As an example, network tunnel pointers '1' and '2' may be respectively generated for VPNs '1' and '2.'

Thereafter, each VPN's associated configuration policy is communicated to the NFD. In certain embodiments, the VPN's associated configuration policy may be implemented to define which networks do not require the use of a VPN. In certain embodiments, the VPN's associated configuration policy may be implemented to define which type of network link (e.g., WLAN, WWAN 226, etc.) is supported for the VPN. In certain embodiments, the configuration policy may be implemented to define what kind of network traffic is allowed to be routed to which VPN. In certain embodiments each VPN's associated configuration policy may be implemented to create a list of available VPNs and their associated available network links. Those of skill in the art will recognize that many such embodiments of the use of such a configuration policy are possible. Accordingly, the foregoing is not intended to limit the spirit, scope, or intent of the invention.

Thereafter, a request from the user device's 204 operating system (OS) may be received by the intelligent connectivity system 118 to assign, or reassign, existing network traffic queues to the previously-identified VPNs. To continue the prior example, network traffic queue '1'→network tunnel '1', network traffic queue '2'→network tunnel '1', and network traffic queue '3'→no network tunnel for non-VPN network traffic. If such a request is received, a determination is then made whether a new network traffic queue is needed. If so, then a new network traffic queue is generated and mapped to an associated network tunnel. Thereafter, or if it was previously determined that a new network traffic queue was not needed, then each available network traffic queue is mapped to an available network link, followed by the establishment of a corresponding new VPN.

Figure 3:
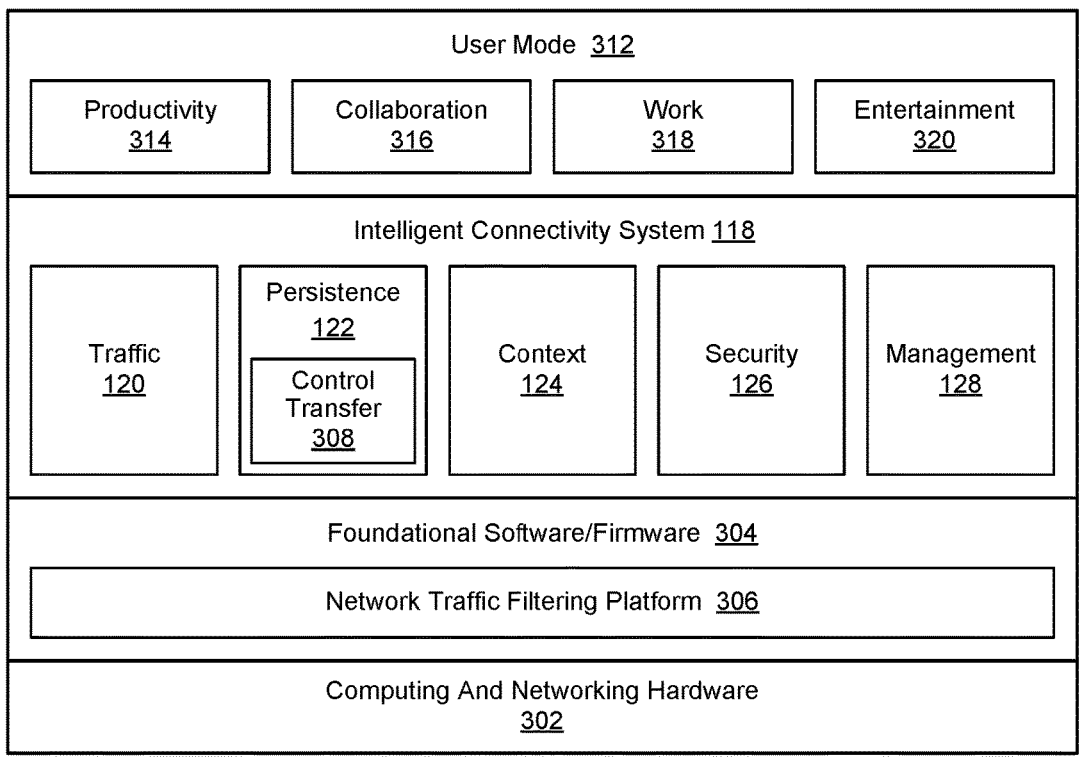
FIG. 3 shows a simplified block diagram of an intelligent connectivity framework.

FIG. 3 shows a simplified block diagram of an intelligent connectivity framework implemented in accordance with an embodiment of the invention. In various embodiments, the intelligent connectivity framework 300 may be implemented to include certain computing and communication hardware 302, certain foundational software and firmware 304, an intelligent connectivity system 118, and one or more operational modes 312, or a combination thereof. In certain embodiments, the computing and communications hardware 302, and the foundational software and firmware 304, or a combination thereof, may be implemented on a user device, described in greater detail herein.

In various embodiments, certain foundational software and firmware 304 may be implemented with certain computing and communication hardware 302, as described in greater detail herein, to detect the availability of connectivity to a particular network. In various embodiments, certain foundational software and firmware 304 may likewise be implemented with certain computing and communication hardware 302 to establish a network link to a detected network, as likewise described in greater detail herein, to communicate information. In certain embodiments, the information may be communicated over one or more virtual private network (VPN) connections. In certain embodiments, the foundational software and firmware 304 may be implemented to include a network traffic filtering platform 306. In certain embodiments, the network traffic filtering platform 306 may be implemented as a WINDOWS® kernel mode filter driver.

In certain embodiments, the intelligent connectivity system 118 may be implemented to perform an intelligent connectivity operation. As used herein, an intelligent connectivity operation broadly refers to any operation whose performance improves a user device's ability to utilize, as described in greater detail herein, network connectivity that may be available for provision by one or more networks. In various embodiments, the intelligent connectivity system 118 may be implemented to use certain computing and communication hardware 302 and certain foundational software and firmware 304, individually or in combination, to perform a particular intelligent connectivity operation.

In certain embodiments, the intelligent connectivity system 118 may be implemented to include a traffic component 120, a persistence component 122, a context component 124, a security component 126, and a management component 128, or a combination thereof. In certain embodiments, the traffic component 120, persistence component 122, context component 124, security component 126, or management component 128 may be implemented, individually or in combination, to perform a particular intelligent connectivity operation. In certain embodiments, the traffic component 120 may be implemented to determine whether one or more networks are available to provide network connectivity to the information handling system 100. In certain embodiments, the traffic component 120 may be implemented to use the one or more networks, individually or in combination, to provide network connectivity to a user device.

In certain embodiments, the persistence component 122 may be implemented to use two or more networks, individually or in combination, to provide network connectivity continuity to a user device. In certain embodiments, the persistence components 122 may be implemented to include a control transfer sub-component 308. In certain embodiments, the control transfer sub-component 308 may be implemented, as described in greater detail herein, to perform a control transfer operation.

As used herein, a control transfer operation broadly refers to any operation performed to transfer the control of an application executing on one network-enabled user device to another network-enabled user device. In certain embodiments, a control transfer operation may be implemented to seamlessly transfer an application executing on a first network-enabled user device to a second network-enabled device, and once it is executing on the second network-enabled user device, enable its control from the second network-enabled user device. In certain embodiments, the transfer of control may occur according to the proximity of one network-enabled device to another, one or more user gestures, or a combination thereof.

In certain embodiments, the context component 124 may be implemented to select one or more networks to provide network connectivity to a user device based upon the context in which the user device is being used. In certain embodiments, the security component 126 may be implemented to select one or more networks to provide secure network connectivity to a user device. In various embodiments, the management component 128 may be implemented to manage certain aspects of network connectivity provided by one or more networks to a user device.

In various embodiments, the intelligent connectivity system 118 may be implemented to provide certain network connectivity, at a particular time, or location, or both, to a user device according to its current operational mode 312. As used herein, an operational mode 312 of a user device broadly refers to the purpose it may be used for. In certain embodiments, the operational mode 312 of a user device may be associated with the use of a particular user device for productivity 314, collaboration 316, work 318, or entertainment 320, or a combination thereof.

As used herein, and as it relates to an operational mode 312, productivity 314 broadly refers to the ratio of output volume to input volume. For example, a consultant for a construction company may need to estimate the cost of a project while at a client's jobsite. In this example, the consultant may enter certain information related to the project, such as the amount and cost of certain materials and anticipated labor costs, into a project estimation application running on a mobile user device. To continue the example, the estimator may achieve a certain level of productivity 314 by simply using the project estimation application to generate an initial estimate.

However, the consultant may achieve a greater level of productivity 314 if the user device is able to use available network connectivity to establish two virtual private network (VPN) connections, one to the consultant's resources and another to the client's resources. If so, then the consultant can use the first VPN connection to securely access past estimates for similar projects, which in turn can be used to prepare a final estimate for the client. Once the final estimate is completed, the second VPN connection can be used to present it to the client.

As used herein, and as it relates to an operational mode 312, collaboration 316 broadly refers to the action of interacting with someone to achieve a common purpose. Skilled practitioners of the art will recognize that many examples of such a common purpose are possible. As an example, the common purpose may be for a group of individuals with a common interest to use their respective user devices to participate in a videoconference to produce or create something. As another example, the common purpose may be for a group of friends to use their respective user devices to meet via videoconference on a regular basis to maintain their relationship.

As used herein, and as it relates to an operational mode 312, work 318 broadly refers to an exertion or effort to produce or accomplish something. Those of skill in the art will be aware that work may take many forms. As an example, an exterminator may be paid by the job. In this example, the exterminator may stop in a coffee shop, access their public WiFi network, and establish a VPN connection to his office. Once connected, the exterminator may securely download his assignments for the day. Then, one by one, he continues on to each location and completes his assignment. To continue the example, after completion of each assignment the exterminator may then complete a report. Once it is complete, the exterminator may then access a cellular network, establish a VPN connection, and then securely upload each report to his office.

Certain embodiments of the invention reflect an appreciation that not all work 318 is performed for monetary reward. For example, some work 318 may be performed for educational purposes. To illustrate this example, a student may use a mobile user device, no matter where they may be, to access knowledge resources through a network connection, use those resources to complete an assignment, and then submit it using the same, or a different, network connection.

As another example, some work 318 may be performed for altruistic reasons. To illustrate this example, a member of a non-profit organization may volunteer to check on the wellbeing of elderly residents. In this example, the volunteer may use the WiFi connection in her home to establish a VPN connection with the non-profit. Once the VPN connection is established, she downloads the list of residents, and their addresses, she is scheduled to visit that day to her tablet computer. She then uses the tablet computer throughout the morning to note the status of each resident. The volunteer then stops at a restaurant for lunch. Once she has ordered, she accesses the WiFi network connection in the restaurant, establishes a VPN connection with the non-profit, and uploads a report summarizing the results of her morning's work.

As used herein, and as it relates to an operational mode 312, entertainment 320 broadly refers to the action of providing, or being provided, with amusement or enjoyment. Skilled practitioners of the art will recognize that entertainment may take many forms. As an example, a user may use a mobile device to wirelessly connect to a Local Area Network (LAN) in their home. Once the connection is established, the user may access a streaming movie service. Once the streaming movie service is accessed, and a movie selected, the user may then use a Bluetooth connection to wirelessly connect a pair of earphones to their mobile device. Once connected, the user can then view the movie on the mobile device as they listen to the movie's soundtrack on their wireless headphones.

As another example, a user may use a gaming computer to play an online, multi-user game. In this example, the user may use a wired connection to the LAN in their home for the gaming computer and a cellular network connection for their mobile phone. To continue the example, the gaming computer may use the wired connection to the LAN to ensure that whatever bandwidth is available on the LAN is dedicated to the online game itself. Likewise, the user may use the mobile phone's connection to the cellular network to carry on a conversation with other players of the online game.

Certain embodiments of the invention reflect that it is possible that a particular operational mode 312 may be associated with the simultaneous use of a particular user device for productivity 314, collaboration 316, work 318, or entertainment 320, or a combination thereof. As an example, a game developer may use a user device, in combination with one or more network connections, while developing a game. In this example, the developer may use the user device, and the one or more network connections to improve their productivity 314, collaborate 316 with co-workers, work 318 on various aspects of the game, all the while being entertained 320 by the game itself. Those of skill in the art will recognize that many such examples of an operational mode 312 are possible. Accordingly, the foregoing is not intended to limit the spirit, scope, or intent of the invention.

Figure 4:
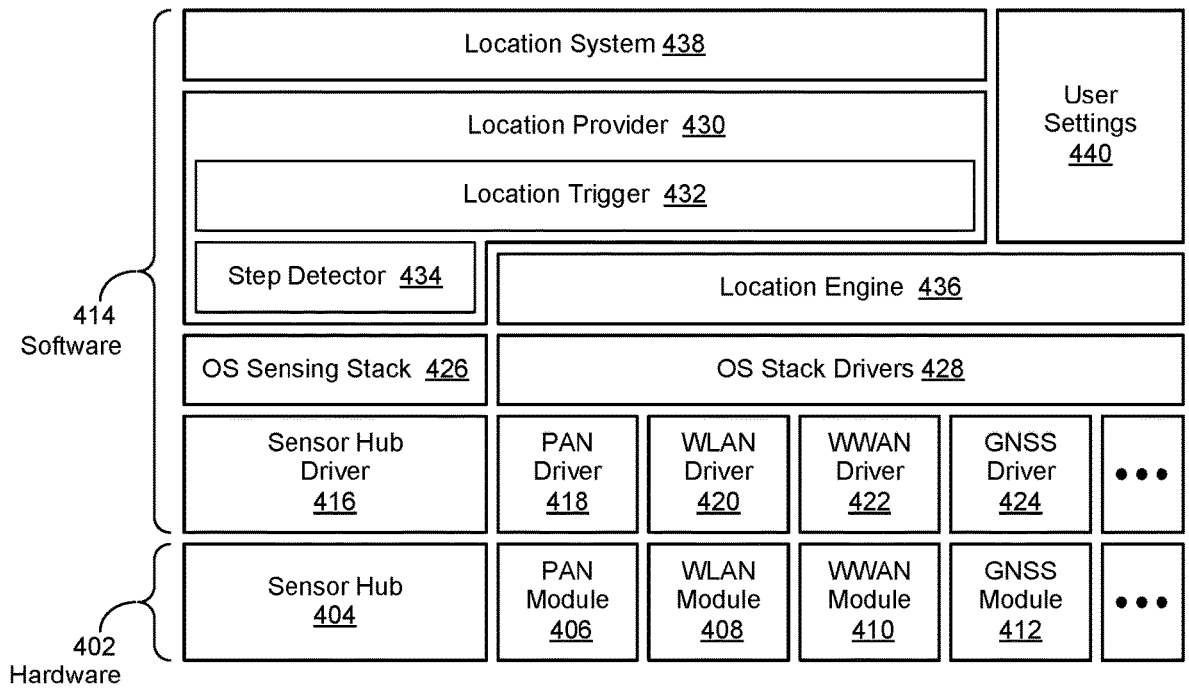
FIG. 4 shows hardware and software components used in the performance of a Bluetooth network connectivity persistence operation.

FIG. 4 shows hardware and software components used in the performance of a Bluetooth network connectivity persistence operation implemented in accordance with an embodiment of the invention. In various embodiments, a user device may be implemented with certain hardware 402 and software 414 components that it may use to determine its location and the location of certain network links, described in greater detail herein. In certain embodiments, the hardware components 402 may include a location sensor hub 404 module, a Personal Area Network (PAN) 406 module, a Wireless Local Area Network (WLAN) 408 module, a Wireless Wide Area Network (WWAN) 410 module, a Global Navigation Satellite System (GNSS) 412 module, and so forth.

As used herein, a sensor hub 404 module broadly refers to a hardware module configured to integrate sensor data from different sensors and process them. In certain embodiments, the sensor hub 404 module may be implemented to off-load sensor-related operations and processes from a user device's primary central processing unit (CPU) to reduce battery consumption and provide associated performance improvements. One known example of a sensor hub 404 module is the INTEL® Integrated Sensor Hub (ISH).

In certain embodiments, the PAN 406 module may be implemented to communicate data through a network link to an associated PAN, described in greater detail herein. In certain embodiments, the WLAN 408 module may be implemented to communicate data through a network link to an associated WLAN, likewise described in greater detail herein. Likewise, as described in greater detail herein, the WWAN 410 module may be implemented in certain embodiments to communicate data through a network link to an associated WWAN. In various embodiments, as likewise described in greater detail herein, the GNSS 412 module may be implemented to receive certain Global Position System (GPS) data from a GPS satellite.

In certain embodiments, the software components 414 may include a sensor hub 416 driver, a PAN 418 driver, a WLAN 420 driver, a WWAN 422 driver, a GNSS 424 driver and so forth. In certain embodiments, the sensor hub 416, PAN 418, WLAN 420, WWAN 422, and GNSS 424 drivers may be implemented to respectively provide a programming interface to control and manage the sensor hub 404, PAN 406, WLAN 408, WWAN 410, and GNSS 412 modules. In certain embodiments, the software components 414 may likewise include an operating system (OS) sensing stack 426 and OS stack drivers 428 familiar to skilled practitioners of the art.

Likewise, in certain embodiments, the software components 414 may include a location engine 436. In certain embodiments, the location engine 436 may be implemented to perform a location determination operation. As used herein, a location determination operation broadly refers to any operation performed to determine the location of a user device, and the location of an available network, and the distance between the two.

In certain embodiments, the software components 414 may likewise include a location provider 430 module. In certain embodiments, the location provider 430 module may be implemented to include a location trigger 432 sub-module, or a step detector 434 sub-module, or both. In various embodiments, the location trigger 432 sub-module may be implemented to perform a geofencing operation. As used herein, a geofencing operation broadly refers to any operation performed to establish a virtual perimeter, commonly referred to as a geo-fence, for a corresponding real-world geographic area.

In certain embodiments, a geo-fence may be dynamically generated, such as a radius around a particular geographic point. In certain embodiments, a geo-fence may be generated as a set of predefined geographic boundaries. In certain embodiments, the location trigger 432 sub-module may be implemented to generate an alert when an associated user device approaches the boundaries of a particular geo-fence. In certain embodiments, the step detector 434 sub-module may be implemented to measure individual steps a user may make in the course of using a particular user device. In various embodiments, the step detector 434 sub-module may be implemented to use certain information provided by a motion sensor, or accelerometer, or both, to make such user step measurements.

In various embodiments, the location trigger 432 sub-module and the step detector 434 sub-module may be implemented, individually or in combination, to provide certain location information they may generate to the location provider 430 module. In various embodiments, the location provider 430 module may be implemented to generate location information for use by software applications executing on a user device. In certain embodiments, the location provider 430 module may be implemented to determine the geographic location of an associated user device by WLAN triangulation, use of location information provided through the use of the IEEE 802.11mc standard, IP address resolution, cellular network tower triangulation, use of Global Position System (GPS) information, or a combination thereof. In various embodiments, the location provider 430 module may be implemented to use certain location information provided by the location trigger 432 and step detector 434 sub-modules to provide location information for use in a location network tag (LNT), described in greater detail herein. One known example of a location provider 430 module is the WINDOWS' LOCATION PROVIDER®, familiar to those of skill in the art.

In certain embodiments, the software components 414 may include a location system 436. In various embodiments, the location system 436 may be implemented to use certain known artificial intelligence (AI) and machine learning (ML) approaches to estimate a particular network link's expected throughput, latency, coverage, signal strength, and other network connectivity metrics. In various embodiments, the location system 436 may be implemented to certain location information provided by the location provider 430, or LNT information it may generate, in the use of such AI and ML approaches.

In certain embodiments, the software components 414 may likewise include a user settings 440 module. In certain embodiments, the user settings 440 module may be implemented to store certain network connectivity settings associated with a user of a user device. Skilled practitioners of the art will recognize that many such embodiments are possible. Accordingly, the foregoing is not intended to limit the spirit, scope, or intent of the invention.

Figure 5A:
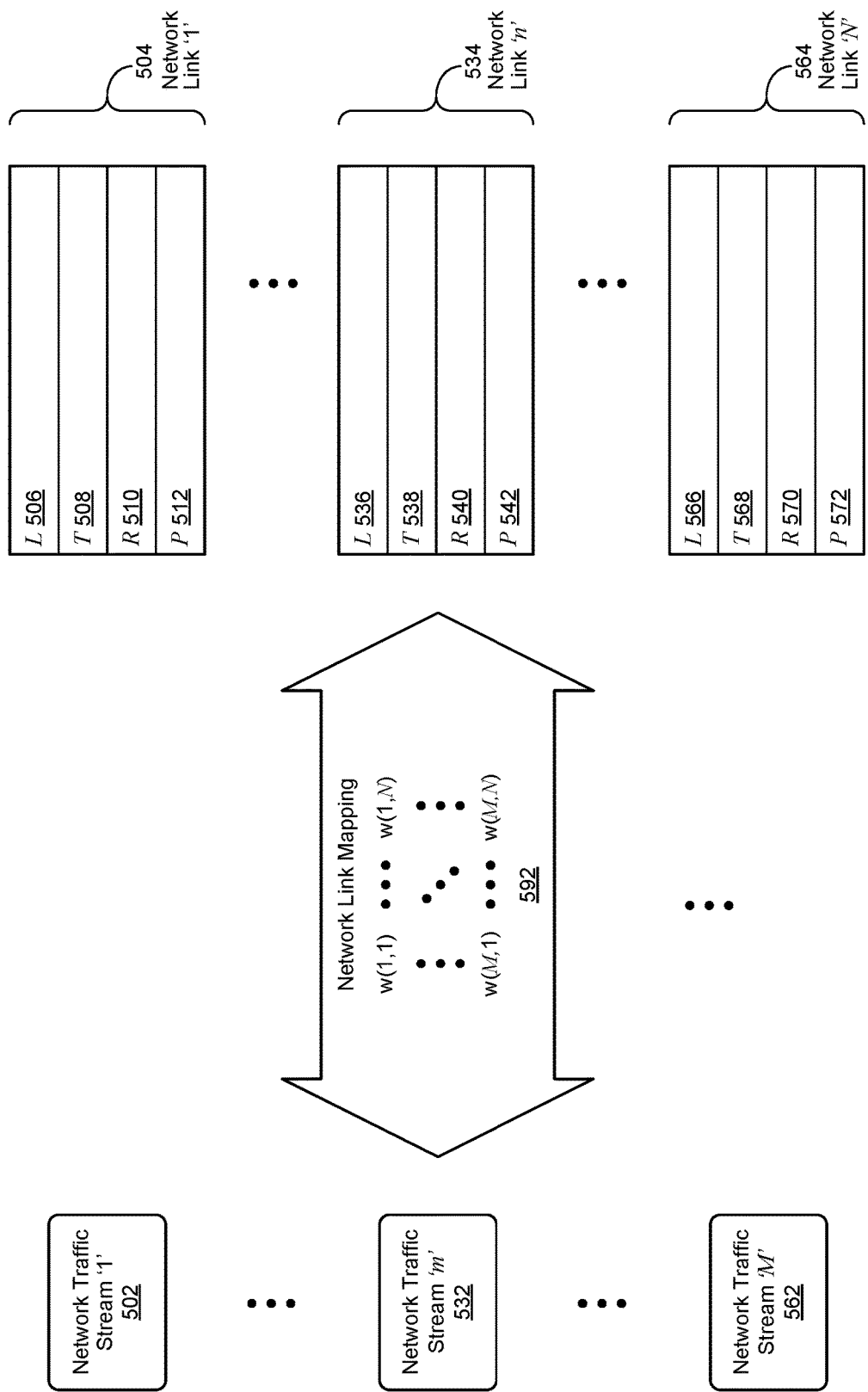
FIGS. 5a and 5b show a simplified block diagram of the use of a network link preference mapping matrix to determine the most suitable network link for a particular network traffic stream according to its associated Quality of Service (QoS) parameters.
Figure 5B:
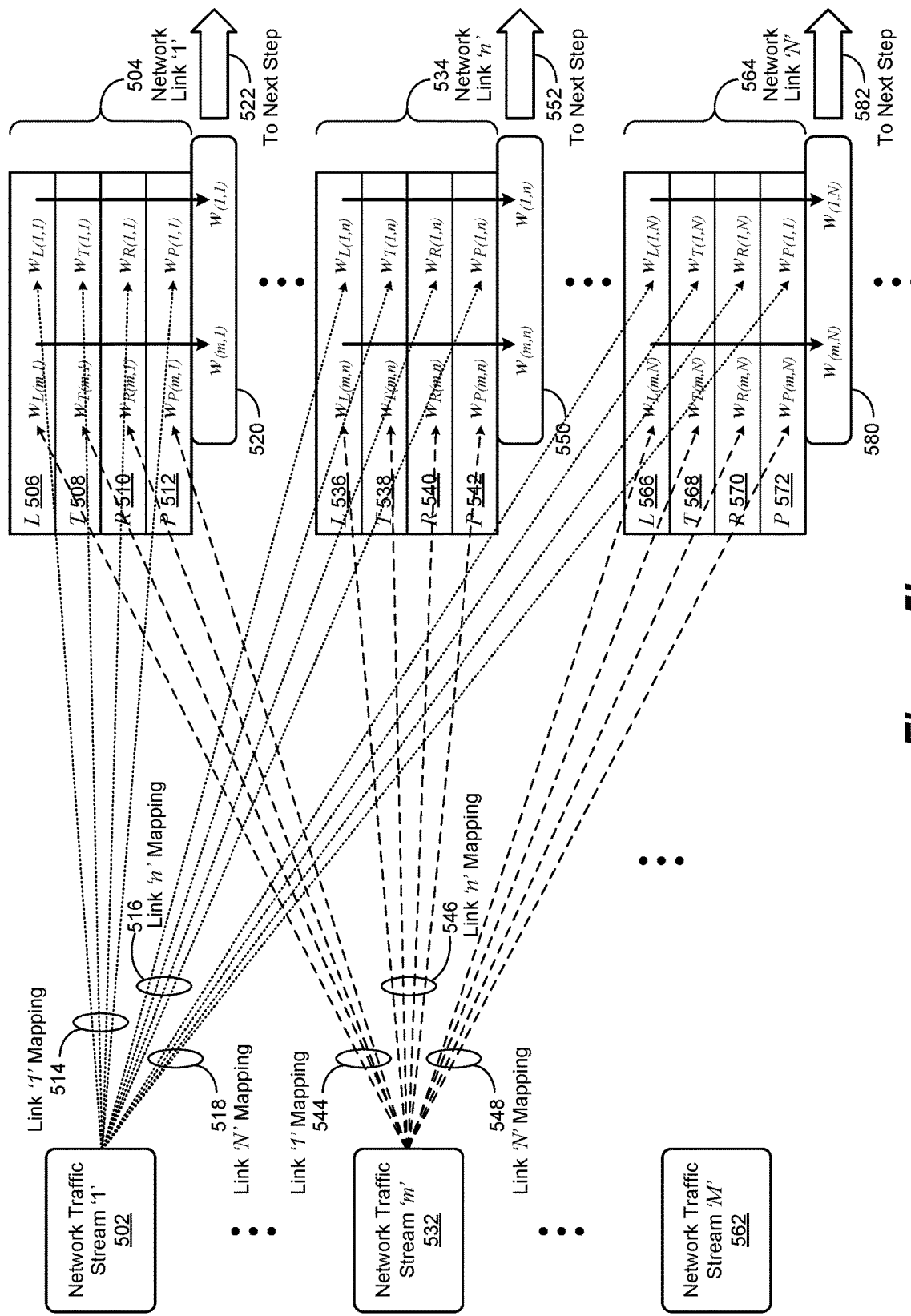
Figure 6A:
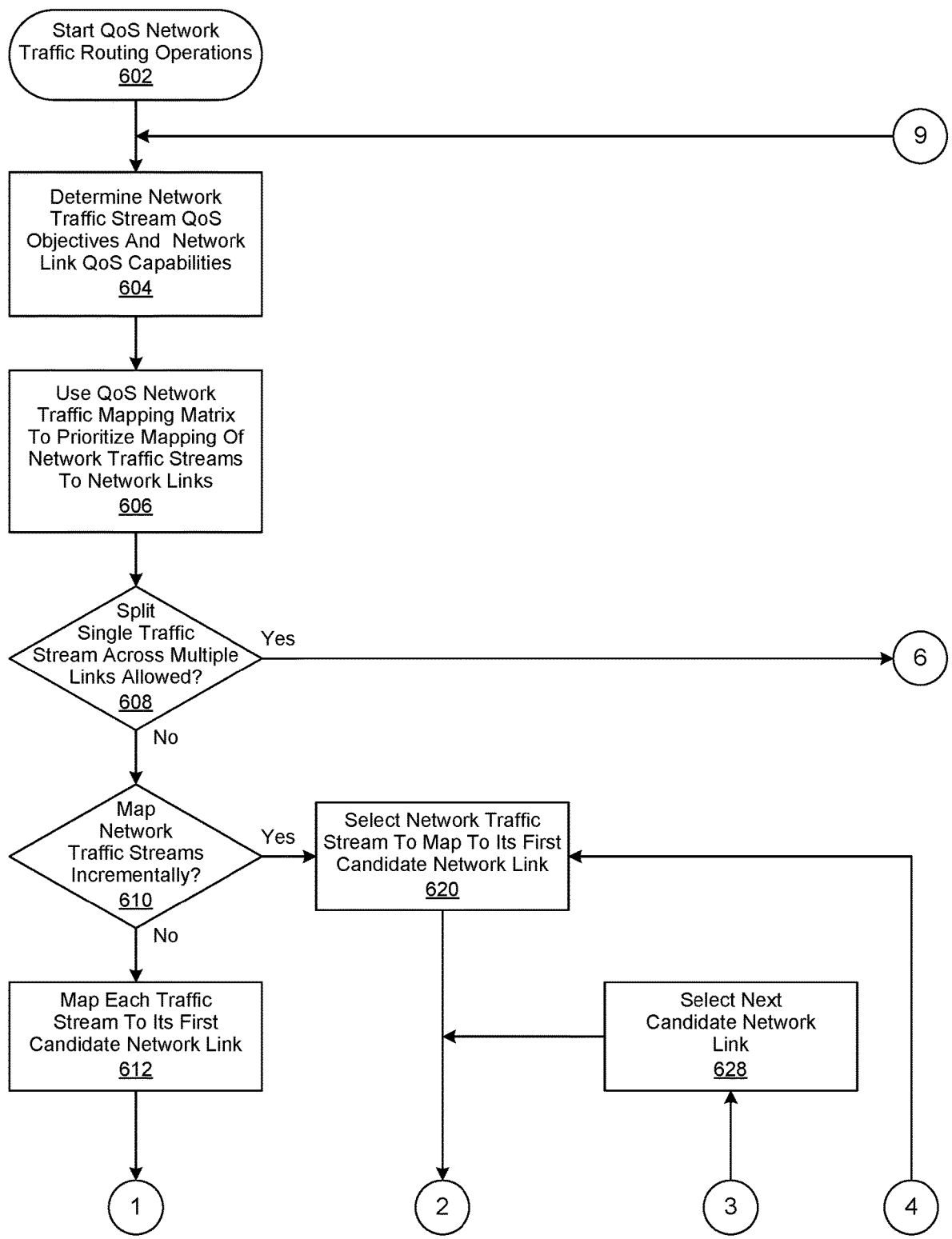
FIGS. 6a through 6d show a flowchart of the performance of QoS network traffic routing operations.
Figure 6B:
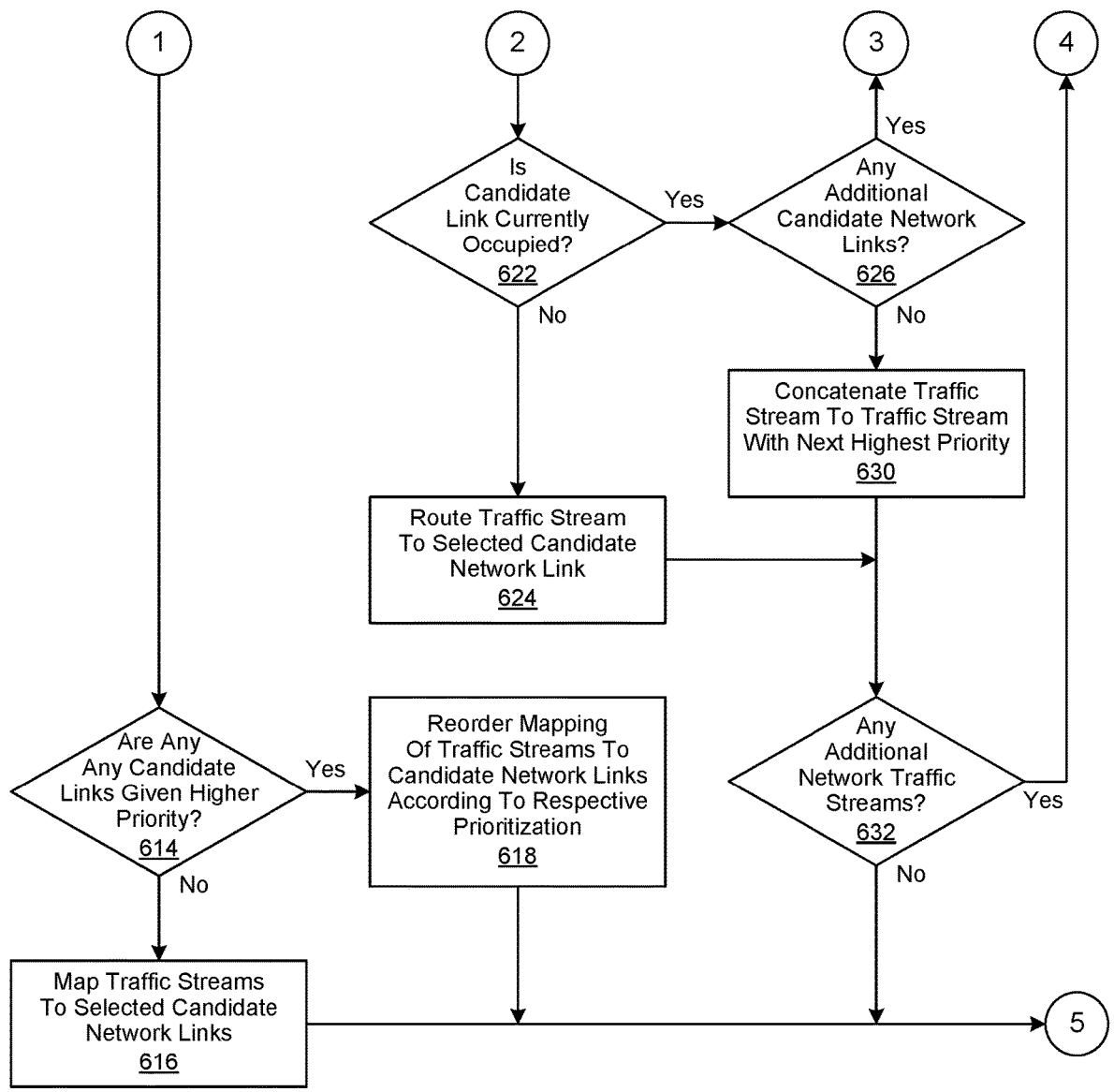
Figure 6C:
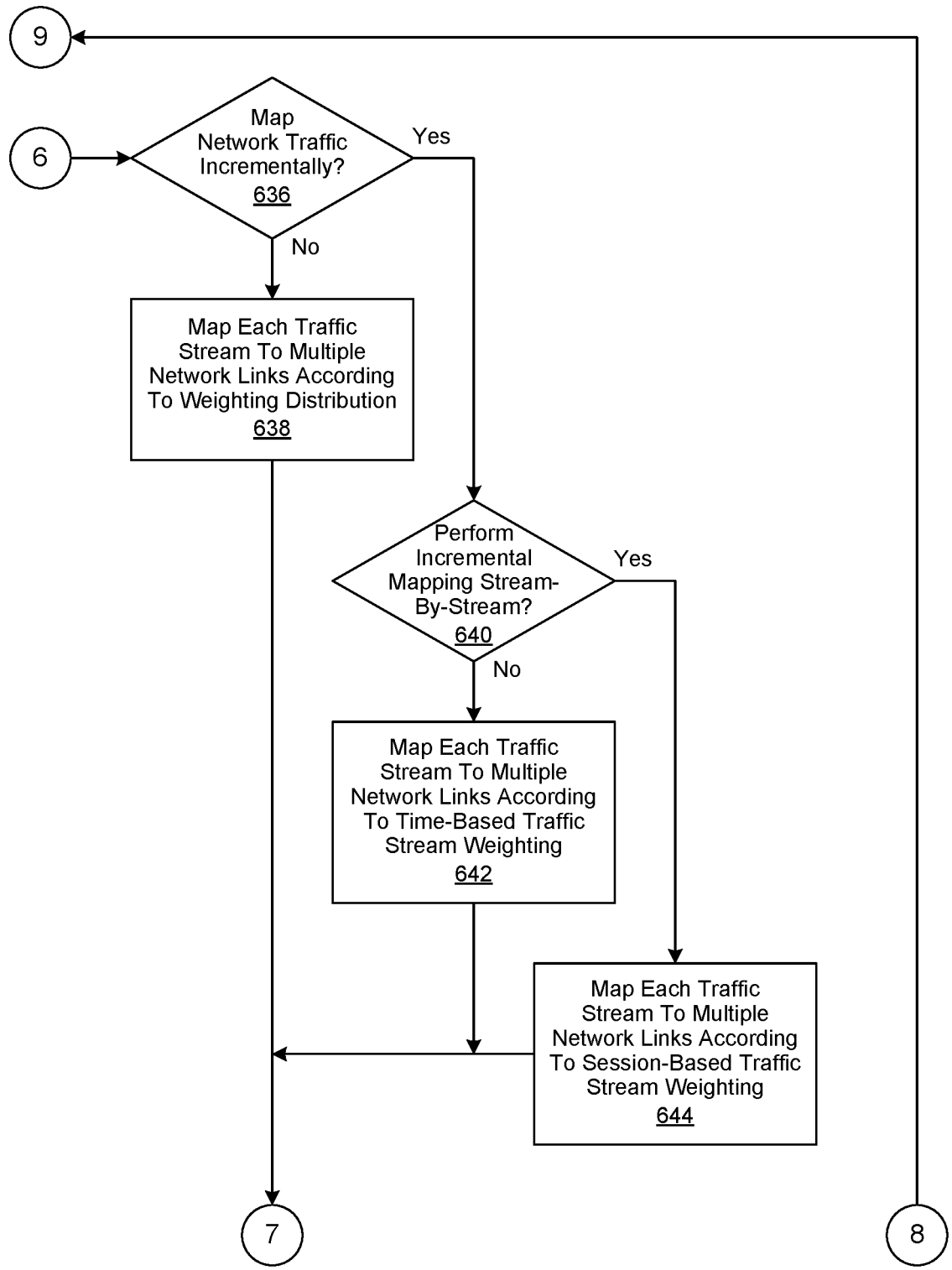
Figure 6D:
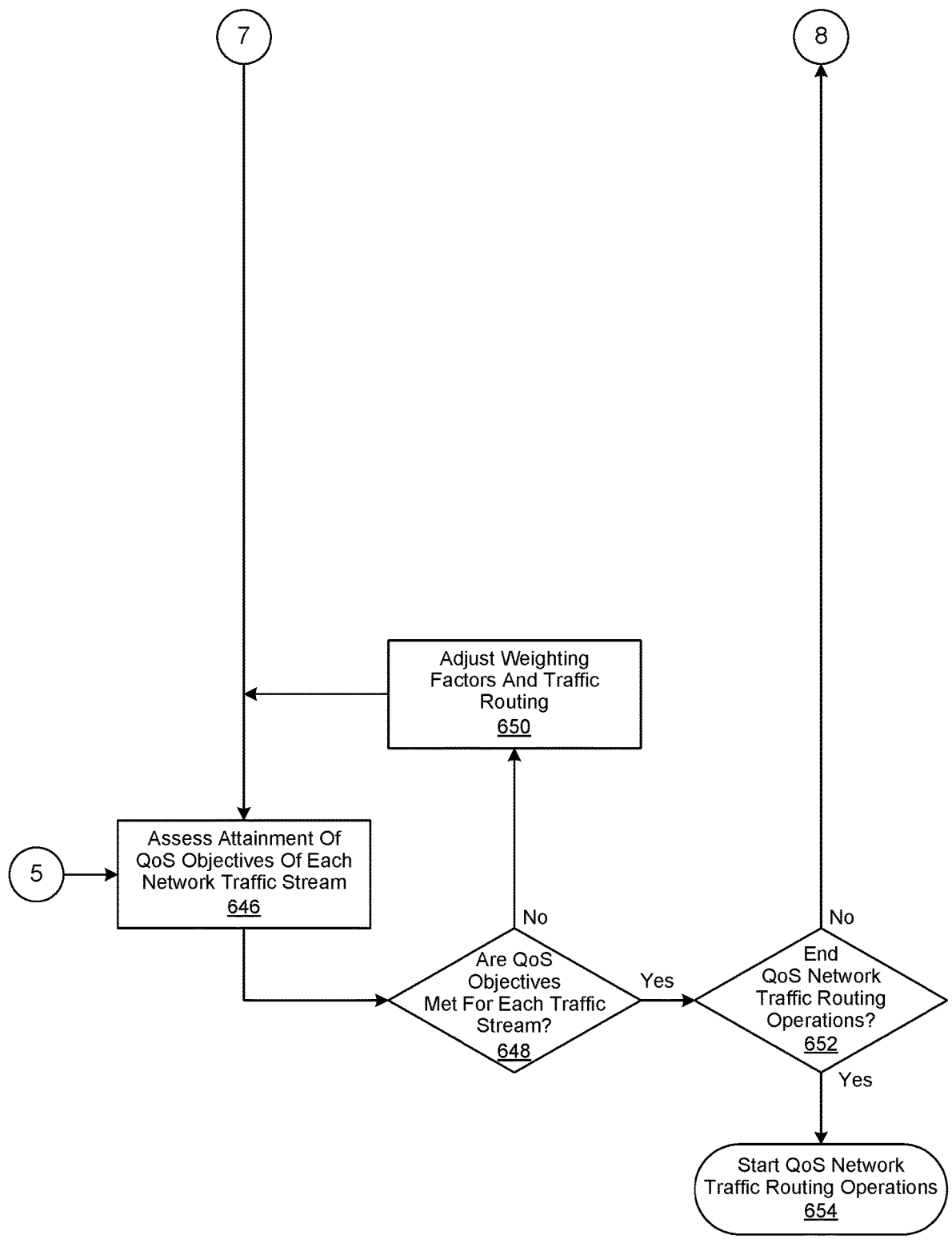

FIGS. 5a and 5b show a simplified block diagram of the performance of network link mapping operations implemented in accordance with an embodiment of the invention to determine the most suitable network link for a particular network traffic stream according to its associated Quality of Service (QoS) parameters. In various embodiments, certain network link mapping 592 operations may be performed to determine the most suitable network link '1' 504, and 'n' 534 through 'N' 564 for network traffic streams '1' 502, and 'm' 532 through 'M' 562 according to their respective QoS capabilities and parameters. In certain embodiments, QoS capabilities of network link '1' 504, and 'n' 534 through 'N' 564, may respectively include latency (L) 506, 536, 566, throughput (T) 508, 538, 568, reliability (R) 510, 540, 570, and priority (P) 512, 542, 572.

In various embodiments, the QoS capability of latency (L) 506, 536, 566 may include the end-to-end latency of certain over-the-air wireless network traffic transmissions, such as that associated with a Wireless Local Area Network (WLAN) or a Wireless Wide Area Network (WWAN). In certain embodiments, the QoS capability of latency 'L' 506, 536, 566 may include the end-to-end latency of certain wired network traffic transmissions, such as that associated with a Local Area Network (LAN) or a Wide Area Network (WWAN). In various embodiments, the QoS capability of throughput 'T' 508, 538, 568 may include the data rate size associated with a particular network link '1' 504 or 'n' 534 through 'N' 564.

In various embodiments, the QoS capability of reliability 'R' 510, 540, 570 may include a composite index of certain metrics, such as network link drop ratio, latency jitter standardization, network link drop fluctuation, and so forth. In various embodiments, the QoS capability of priority 'P' 512, 542, 572 may include a preference threshold value for a certain network link '1' 504, or 'n' 534 through 'N' 564. In certain embodiments, other QoS capability for network link '1' 504, and 'n' 534 through 'N' 564 may be implemented. In these embodiments, the other QoS capabilities chosen for implementation is a matter of design choice.

In various embodiments, certain weighting operations may be performed to apply a weighting factor 'w' to a QoS parameter of network traffic streams '1' 502 and 'm' 532 through 'M' 562 to indicate a preference for a particular network link '1' 504, or 'n' 534 through 'N' 564. In certain embodiments, a sign (e.g., '−'. '+', etc.) may be added as a prefix to a weighting factor 'w' to further indicate a QoS preference for a particular network link '1' 504, or 'n' 534 through 'N' 564. For example, "−ve" may indicate a QoS preference for WWAN link, while "+ve" may indicate a QoS preference for a WLAN link.

In various embodiments, certain QoS bargaining approaches, familiar to skilled practitioners of the art, may be implemented to adjust one or more QoS parameters (e.g., a particular network slice in a 5G transmission to achieve high reliability and low latency) for network links '1' 504, or 'n' 534 through 'N' 564. In various embodiments, network link '1' 504, and 'n' 534 through 'N' 564, may be ranked according to their respective QoS capabilities. In various embodiments, the respective ranking of network link '1' 504, and 'n' 534 through 'N' 564, may be updated on a recurring basis (e.g., every 10 ms) according to certain near-real-time network link attributes familiar to those of skill in the art.

In various embodiments, a water filling approach, likewise familiar to skilled practitioners of the art, may be implemented to poll each network link '1' 504 and 'n' 534 through 'N' 564 to determine whether the QoS capacity parameter of one or more network traffic streams '1' 502, and 'm' 532 through 'M' 562 does not exceed their available capacity, either individually or in combination. In various embodiments, the network link '1' 504, and 'n' 534 through 'N' 564 that has the greatest capacity may be selected when the QoS capacity parameter of one or more network traffic streams '1' 502, and 'm' 532 through 'M' 562 exceeds their available capacity, either individually or in combination. In certain of these embodiments, further water filling operations may be performed to poll the remaining network links '1' 504, and 'n' 534 through 'N' 564, to determine the network link with the next highest capacity.

In various embodiments, the network link mapping 592 operations may be implemented to include the use of a network link preference mapping matrix to determine the most suitable network link '1' 504, and 'n' 534 through 'N' 564, for network traffic streams '1' 502, and 'm' 532 through 'M' 562, according to their respective QoS capabilities and parameters. For example, as shown in FIG. 5b, a particular user device context, described in greater detail herein, may produce 'M' 562 network traffic streams and have access to 'N' 564 network links. In this example, each of the network traffic streams '1' 502, and 'm' 532 through 'M' 562, respectively have certain associated QoS parameters. Likewise, each of the network links '1' 504, and 'n' 534 through 'N' 564, have associated QoS capabilities.

To continue the example, performance of certain network link mapping 592 operations may result in the generation of network link mappings '1' 514, 544, 'n' 516, 546, and 'N' 518, 548 respectively between network traffic streams '1' 502 and 'm' 532 and network links '1' 504 and 'n' 534 through 'N' 564. In this example, each of the network link mappings '1' 514, 544, 'n' 516, 546, and 'N' 518, 548 map the QoS parameters of network traffic streams '1' 502 and 'm' 532 to the QoS capabilities of network links '1' 504, and 'n' 534 through 'N' 564. To further illustrate this example, the weight of the network link mapping 'n' 546 between the QoS parameters of network traffic stream 'm' 532 and the QoS capabilities of network link 'n' 534 can be generated as follows:

$$w(m,n) = \text{sign}*(w_{L(m,n)}L + w_{T(m,n)}T + w_{R(m,n)}R + w_{P(m,n)}P)$$

where $w_{i(m,n)}$ denotes the relative importance of the ith QoS capability (e.g., L 536, T 538, R 540, P 542) of network link 'n' 534

In certain embodiments, once network link mapping 592 operations are completed, the resulting network link mappings, such as network link mappings '1' 514, 544, 'n' 516, 546, and 'N' 518, 548 shown in FIG. 5b, are processed to generate a network link preference mapping matrix of M 562 network traffic streams by N 564 network links. In various embodiments, this network link preference mapping matrix may be updated on a recurring basis (e.g., every 10 ms) to reflect updates certain weighting factors as they occur.

Accordingly, in certain embodiments, the network link preference mapping matrix may be implemented to provide the best candidate network link 520, 550, 580 for the QoS parameters of a particular network traffic stream (e.g., network traffic streams '1' 502, and 'm' 532 through 'M' 562). Likewise, in certain embodiments, the network link preference mapping matrix may be implemented to provide the next best candidate network link (e.g., $2^{nd}$, $3^{rd}$ and $4^{th}$ best candidates, and so forth). In various embodiments, certain next steps 522, 552, 582 may be performed, such as routing a particular network traffic stream (e.g., network traffic streams '1' 502 and 'm' 532 through 'M' 562) to a particular network link (e.g., network links '1' 504 and 'n' 534 through 'N' 564).

FIGS. 6a through 6d show a flowchart of the performance of Quality of Service (QoS) network traffic routing operations implemented in accordance with an embodiment of the invention. In this embodiment, QoS network traffic routing operations are begun in step 602, followed by determining the QoS parameters of active network traffic streams and the QoS capabilities of available network links in step 604. A determination is then made in step 608 whether it is allowed to split an individual network traffic stream between multiple network links. If not, then a determination is made in step 610 whether to map a stream of network traffic incrementally. If not, then each active network traffic stream is mapped in step 612 to its first candidate network link, as described in greater detail herein.

A determination is then made in step 614 whether any candidate network links have been given a higher priority to other network traffic streams. If not, then the active streams of network traffic are respectively mapped to their first candidate network links in step 616. Otherwise, the mapping of network traffic streams to their candidate network links is reordered in step 618 to reflect their prioritization.

However, if it was determined in step 610 to map streams of network traffic incrementally, then a network traffic stream is selected in step 620 to map to its first candidate network link. A determination is then made in step 622 whether the first candidate network link is currently occupied by another stream of network traffic. If not, then the network traffic stream is routed in step 624 to its selected candidate network link.

Otherwise, a determination is made in step 626 whether any additional candidate network links (e.g., a $2^{nd}$, $3^{rd}$, or $4^{th}$ candidate) are available. If so, then the next candidate network link is selected in step 628 and the process is continued with step 622. Otherwise, the network traffic stream is concatenated in step 630 to the network traffic stream with the next highest priority. Thereafter, or after the operations in step 624 are completed, a determination is made in step 632 whether there are any additional network traffic streams to be mapped to a candidate network link. If so, the process is continued, proceeding with step 620.

However, if it was determined in step 608 that it was permissible to split an individual stream of network traffic across two network links, then a determination is made in step 636 whether to incrementally map the stream of network traffic to a single network link. If not, then each stream of network traffic is respectively mapped to multiple network links in step 638 according to the distribution of their individual weighting, described in greater detail herein. Otherwise, a determination is made in step 640 whether to perform incremental mapping of each network traffic stream to multiple network links.

If not, then each stream of network traffic is mapped in step 642 to multiple network links according to time-based network traffic stream weighting. Otherwise, each stream of network traffic is mapped in step 644 to multiple network links according to session-based network traffic stream waiting. As used herein, a session broadly refers to an interval of time during which a user device may be used by a user for a particular user device context, described in greater detail herein.

Thereafter, or once the operations have been completed in steps 616, 618, 638, and 642, or if it was determined in step 632 that there were no additional network traffic streams, then the attainment of the respective QoS parameters of each network traffic stream is assessed in step 646. Thereafter, a determination is made in step 648 whether the QoS parameters for each network traffic stream has been met. If not, then weighting factors and network traffic routing are adjusted in step 650 and the process is continued, proceeding with step 643. Otherwise, a determination is made in step 652 whether to end QoS network traffic routing operations. If not, then the process is continued, proceeding with step 604. Otherwise, QoS network traffic routing operations are ended in step 654.

Figure 7:
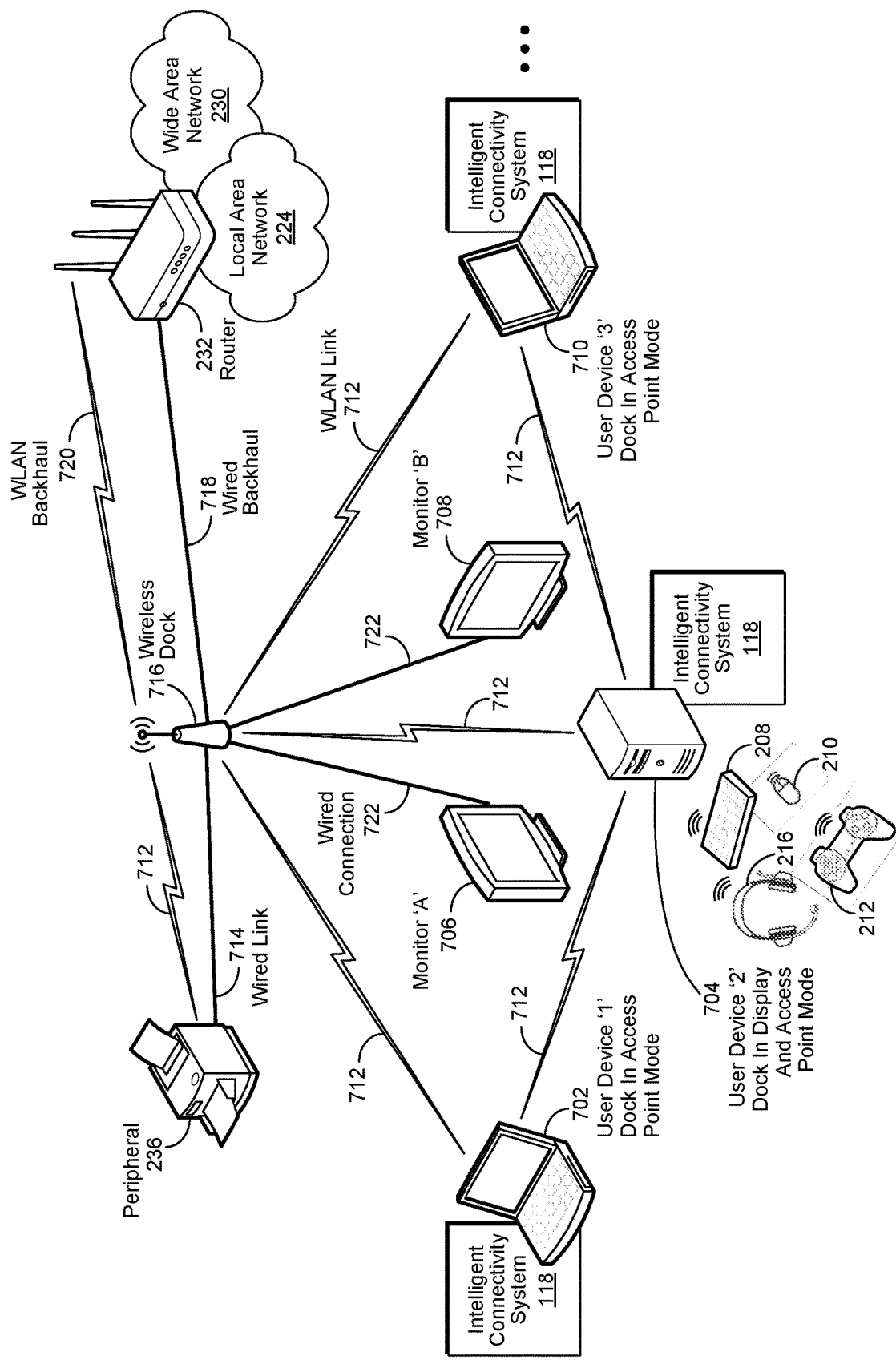
FIG. 7 shows a simplified block diagram of the performance of QoS network traffic routing operations for scaled connectivity management.

FIG. 7 shows a simplified block diagram of the performance of QoS network traffic routing operations implemented in accordance with an embodiment of the invention for scaled connectivity management. In certain embodiments, a router 232, familiar to skilled practitioners of the art, may be implemented to provide network connectivity to a Local Area Network (LAN) 224, or a Wide Area Network (WAN) 230, or both. In certain embodiments, a wireless dock 716, familiar to those of skill in the art, may be implemented to establish network connectivity with the router 232 via a wired 718 backhaul connection (e.g., an Ethernet connection), or one or more Wireless Local Area Network (WLAN) 720 backhaul connections.

In certain embodiments, the wireless dock 716 may likewise be implemented provide user devices '1' 702, '2' 704, '3' 710, and so forth, wireless access to the LAN 224, or the WAN 230, or both, via one or more Wireless Local Area Network (WLAN) links 712. Likewise, in certain embodiments, the wireless dock 716 may be implemented to establish one or more network links to one or more peripherals 236, such as a printer, via a wired 714 network link, or one or more WLAN 712 links, or a combination thereof. In certain embodiments, the wireless dock 716 may be implemented to provide a connection to one or peripherals, such as monitors 'A' 706 and 'B' 708 via a wired connection 722. Examples of such wired connections 722 include a Universal Serial Bus (USB) connection, an IEEE 1394 connection, a Digital Visual Interface (DVI) connection, a DisplayPort connection, a High-Definition Multimedia Interface (HDMI) connection, and so forth. In certain embodiments, the wireless dock 716 may likewise be implemented to provide one or more Personal Area Network (PAN) links with one or more input/output (I/O) devices, such as a keyboard 208, a mouse 210, a gaming controller 212, a headset 216, and so forth.

In various embodiments, user devices '1' 702, '2' 704, '3' 710, and so forth may be implemented to support certain Dual-Band Simultaneous (DBS) approaches familiar to skilled practitioners of the art that allow two or more concurrent Wireless Fidelity (WiFi) channels (e.g., 2.4 GHz and 5 GHz) to be combined. Those of skill in the art will likewise be aware that such DBS approaches typically result in WLAN links that have higher speed, reduced latency, and less interference. In various embodiments, an intelligent connectivity system 118 may be respectively implemented with user devices '1' 702, '2' 704, '3' 710, and so forth, to use certain DBS capabilities to perform an adaptive link persistence operation. As used herein, an adaptive link persistence operation broadly refers to any operation whose performance enables network connectivity for a particular user device to be persisted through the use of one or more network links.

In various embodiments, as described in greater detail herein, an intelligent connectivity system 118 may be respectively implemented with user devices '1' 702, '2' 704, '3' 710, and so forth, to route certain streams of network traffic to certain network links. In various embodiments, as likewise described in greater detail herein, the intelligent connectivity system 118 may be implemented to perform such routing according to certain Quality of Service (QoS) parameters of a particular stream of network traffic and the QoS capabilities of available network links. In certain embodiments, the intelligent connectivity system 118 may likewise be implemented to manage the QoS parameters of multiple, concurrent network traffic streams sharing a common network link.

For example, as shown in FIG. 7, user devices '1' 702, '2' 704, '3' 710 may be used concurrently in an online gaming session. In this example, individual network traffic streams associated with user devices '1' 702, '2' 704, '3' 710 may all be routed to the wireless dock 716 via their respective WLAN links 712. To continue the example, if only one user device (e.g., user device '2' 704) is implemented with QoS parameters, then its network traffic stream will receive priority over user devices '2' 704 and '3' 710, placing their associated users at a disadvantage. However, the possibility of such a disadvantage may be alleviated by managing the QoS parameters of user devices '1' 702, '2' 704, '3' 710 such that they equally share the QoS capabilities of their respective WLAN links 712 to the wireless dock 716.

Accordingly, various embodiments of the invention reflect an appreciation that connectivity throughput may not be as important as seamless, persistent connectivity for certain user device contexts, such as online gaming and others, described in greater detail herein. Certain embodiments of the invention likewise reflect an appreciation that the ability to identify a particular user device context, determine the QoS parameters of associated network traffic streams, identify available network links and their associated QoS capabilities, and perform seamless routing of network traffic according to their respective QoS parameters and capabilities, as described in greater detail herein, may be advantageous.

As an example, two of more user devices (e.g., user devices '1' 702, '2' 704, '3' 710) may each be implemented with DBS capabilities that allows it to simultaneously use two WiFi channels (e.g., 2.4 GHz and 5 GHz) for higher network connectivity speed. In this example, network connectivity may be sustained on one WiFi channel if the other WiFi channel deteriorates to the point it can no longer convey network traffic. Furthermore, in certain embodiments, each of the user devices may be implemented with an intelligent connectivity system 118 such that the QoS parameters of each of the user device's associated network traffic streams receive the same proportion of network link QoS capabilities, regardless of whether one WiFi channel is used, or two. In various embodiments, QoS parameters and capabilities respectively associated with certain network traffic streams and network links may include uplink and downlink network traffic bandwidth budgets, QoS priorities for network traffic uplinking, and so forth. Accordingly, in certain embodiments, such capabilities may be implemented as "scaled network traffic management."

To continue a prior example, user devices '1' 702, '2' 704, '3' 710 may all be concurrently used for an online gaming session where the users are physically co-located and viewing the gaming session on monitors 'A' 706 and 'B' 708. In this example, as shown in FIG. 7, user device '2' 704 may be used to provide video output to monitors 'A' 706 and 'B' 708 via its associated WLAN 712 link to the wireless dock 716. Accordingly, skilled practitioners of the art will recognize the WLAN 712 link associated with user device '2' will be more congested than the WLAN 712 links associated with user devices '1' 702 and '3' 710.

Those of skill in the art will likewise recognize that the network streams associated with user devices '1' 702 and '3' 710 will receive a disproportionate share of WLAN 712 link QoS capabilities. However, by taking the network traffic stream associated with video output to monitors 'A' 706 and 'B' 708 into account, the remaining QoS capabilities of the WLAN links 712 may be shared equally between user devices '1' 702, '2' 704, '3' 710. Skilled practitioners of the art will recognize that many such examples are possible. Accordingly, the foregoing is not intended to limit the spirit, scope, or intent of the invention.

Figure 8:
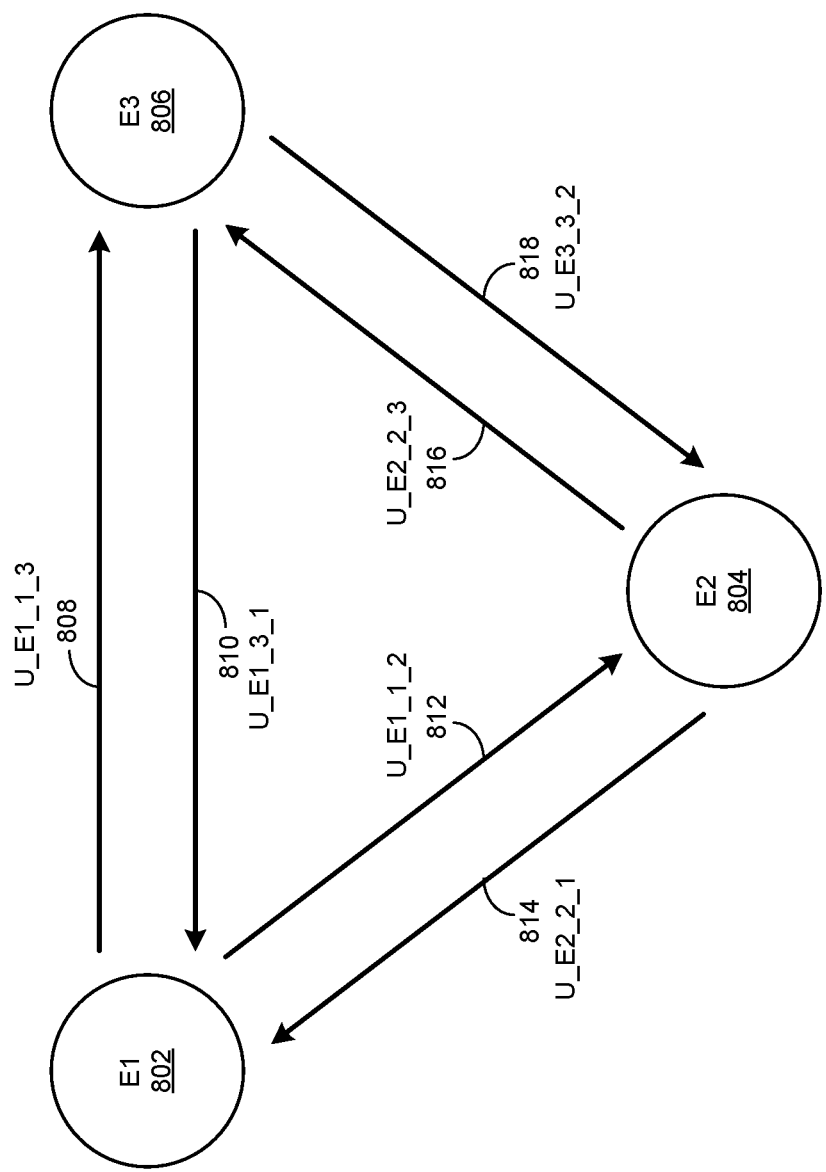
FIG. 8 shows a simplified block diagram of the performance of QoS network traffic routing operations in a mesh computing environment.

FIG. 8 shows a simplified block diagram of the performance of Quality of Service (QoS) network traffic routing operations implemented in accordance with an embodiment of the invention in a mesh computing environment. As used herein, a mesh computing environment broadly refers two or more user devices configured to perform peer-to-peer (P2P) communications during a session, described in greater detail herein. In various embodiments, as described in greater detail herein, one or more intelligent connectivity systems, described in greater detail herein, may be respectively implemented on two or more user devices to perform certain QoS network traffic routing operations, likewise described in greater detail herein. In various embodiments, the QoS network traffic routing operations may be implemented to manage the proportionate sharing of certain QoS capabilities of one or more network links according to the QoS parameters of one or more network traffic streams respectively associated with two or more user devices, as described in greater detail herein, operating in a mesh computing environment.

Referring to FIG. 8, E1 802, E2 804 and E3 806 are nodes of a mesh computing environment respectively corresponding to user devices '1', '2', and '3', each of which are implemented to support bi-directional network traffic streams 808, 810, 812, 814, 816, and 818 between one another. In this embodiment, QoS of each traffic stream 808, 810, 812, 814, 816, 818 is measured on a scale of 1-10, where 1 is best, and 10 is worst. In this embodiment, assume the optimal bandwidth (BW) U_Ex_x_y and the optimal QoS Q_Ex_x_y needs to be determined such that SUM{U_Ex_x_y} and MIN{Q_Ex_x_y} are true conditions.

Accordingly, the expressions U_Ex_x_y and Q_Ex_x_y are used to denote the maximum (MAX) uplink BW budget for node 'x' to send network traffic to node 'y'. As shown in FIG. 8, U_E1_1_2 812 is the MAX uplink BW budget to send traffic from node E1 802 to node E2 804. Accordingly, Q_E1_1_2 is likewise the best QoS parameter of node E1 802 to send network traffic to node E2 804. Likewise, a determination of uplink BW may result in a returned value being denoted as B_U_Ex, which is the MAX uplink budget for transmission for node Ex. The determination of uplink BW may likewise result in a returned latency value being denoted as Q_U_Ex, which maps to a MIN QoS for that network link. Accordingly, the overall uplink transmission BW across all network links for node Ex would be denoted as: BW_Ex=>BW_Ex=SUM{U_Ex_x_y} across all y's. Likewise, the best QoS budget, for the most sensitive real-time network traffic, across all network links for node Ex would be denoted as QoS_Ex=MIN{Q_Ex_x_y} across all y's.

Figure 9A:
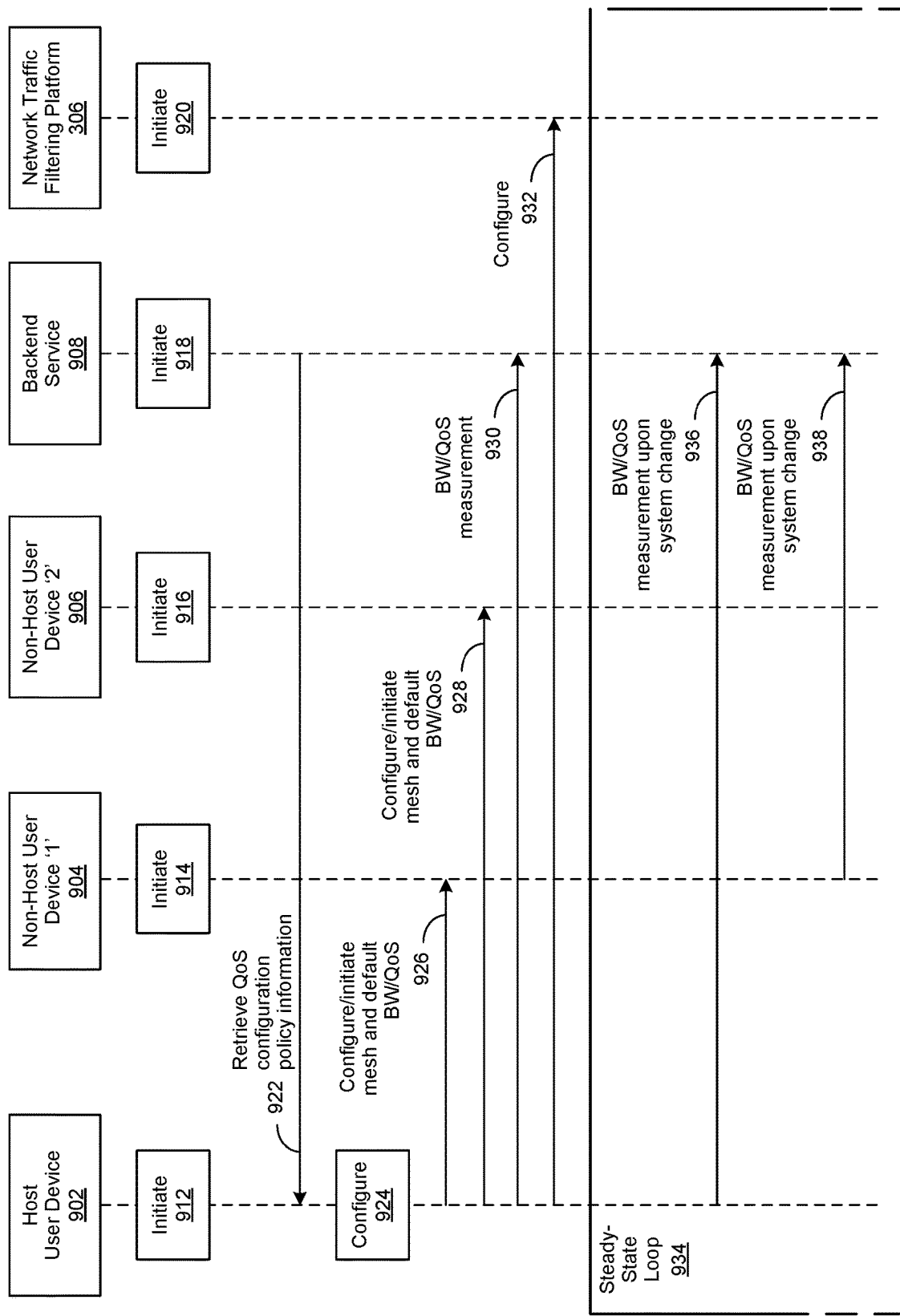
FIGS. 9a and 9b show process flows associated with the performance of QoS network traffic routing operations in a mesh computing environment.
Figure 9B:
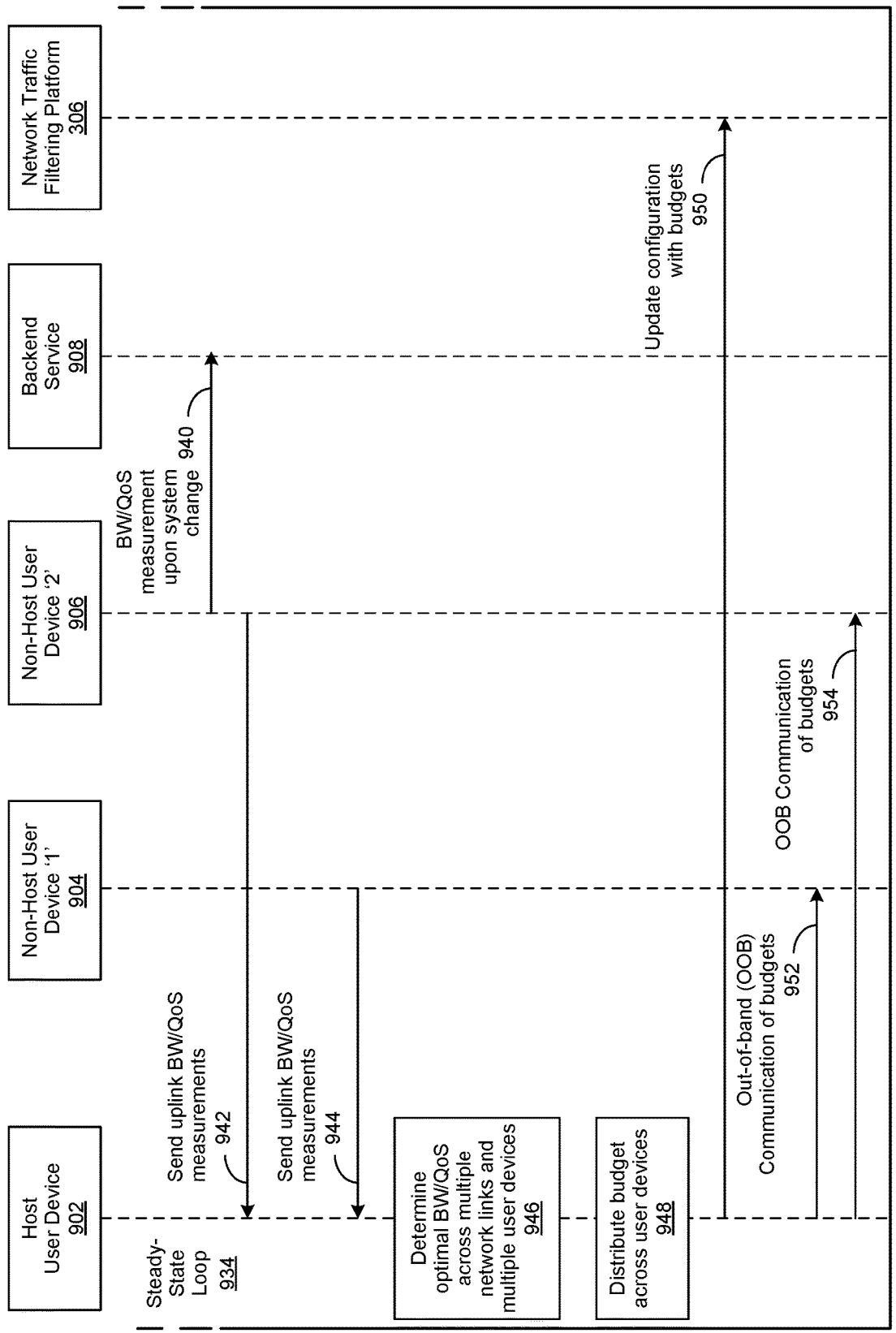

FIGS. 9a and 9b show process flows associated with the performance of Quality of Service (QoS) network traffic routing operations implemented in accordance with an embodiment of the invention in a mesh computing environment. In this embodiment, a host user device 902, a non-host user device '1' 904, a non-host user device '2' 906, a backend service 908, and a network traffic filtering platform 306, described in greater detail herein, are respective initiated in steps 912, 914, 916, 918, 920. In certain embodiments, the initiation performed in steps 912, 914, 916, 918, and 920 result in the establishment of a mesh computing environment between the host 902, the non-host user device '1' 904, the non-host user device '2' 906, the backend service 908, and the network traffic filtering platform 306.

In certain embodiments, the host user device 902, the non-host user device '1' 904, the non-host user device '2' 906, and the backend service 908 may individually be implemented with an intelligent connectivity system, described in greater detail herein. In certain embodiments, individual intelligent connectivity systems implemented on the host user device 902, the non-host user device '1' 904, the non-host user device '2' 906, and the backend service 908, may be implemented individually, or in combination with one another, to perform certain QoS network traffic routing operations, described in greater detail herein. In various embodiments, the QoS network traffic routing operations may be implemented to manage the proportionate sharing of certain QoS capabilities of one or more network links according to the QoS parameters of one or more network traffic streams respectively associated with two or more user devices, as likewise described in greater detail herein.

In this embodiment, an intelligent connectivity system is implemented on the backend service 908. In certain embodiments, the intelligent connectivity system implemented on the backend service 908 may be used to measure, or otherwise monitor, certain QoS parameters, or bandwidth (BW) metrics, or both, associated with network traffic streams corresponding to the host user device 902, the non-host user device '1' 904, and the non-host user device '2' 906, and one or more network links. Once initiation of the host user device 902, the non-host user device '1' 904, the non-host user device '2' 906, and the backend service 908 has been completed in steps 912, 914, 916, 918, and 920, QoS configuration policy information is retrieved from the backend service 908 by the host user device 902 in step 922.

The retrieved QoS configuration policy information is then used in step 912 to configure host user device 902 for the performance of QoS network traffic routing operations. Once configured, the host user device 902 then uses the QoS configuration policy information in steps 926 and 928 to establish a mesh computing environment with itself and the non-host user devices '1' 904 and '2' 906, and to establish default BW and QoS parameters. In turn, the retrieved QoS configuration policy information is then used in step 932 by the host user device 902 to configure the network traffic filtering platform 306. Once configured, the network traffic filtering platform 306 may be implemented in various embodiments to use certain QoS and BW information associated with the host 902, non-host '1' 904, and non-host '2' 906 user devices, and one or more network links, to perform multi-queue QoS and uplink BW modulation operations familiar to those of skill in the art.

Ongoing steady state loop operations are then begun in step 934, with the host user device 902, the non-host user device '1' 904, and the non-host user device '2' 906 respectively providing BW and QoS measurements whenever there is change in their system status to the backend service 908 in steps 936, 938 and 940. In response, the non-host user device '1' 904 and the non-host user device '2' 906 respectively provide their associated uplink BW and QoS measurements to the host user device 902 in steps 942 and 944. Then, in step 946, the host user device 902 uses the uplink BW and QoS measurements associated with the non-host user device '1' 904 and the non-host user device '2' 906, as well as its own, to determine the optimal distribution of BW and QoS capabilities across user devices 902, 904, and 906 and whatever network links they may be using.

Budget information associated with the optimal distribution of BW and QoS capabilities is then distributed by the host user device 902 to the non-host user device '1' 904 and the non-host user device '2' 906 in step 948. In turn, the host user device 902 updates the network traffic filtering platform 306 with QoS configuration and BW budget information in step 950. Thereafter, the host user device 902 respectively communicates the QoS configuration and BW budget information to the non-host user device '1' 904 and the non-host user device '2' 906 in steps 952 and 954. In certain embodiments, the communication of the QoS configuration and BW budget information to the non-host user device '1' 904 and the non-host user device '2' 906 in steps 952 and 954 is performed Out Of Band (OOB).

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as JAVA, SMALLTALK, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing an intelligent connectivity operation, comprising:
Identifying, via the intelligent connectivity operation, a plurality of quality parameters associated with respective network traffic types of an application, each respective network traffic type having an associated traffic stream;
constructing, via the intelligent connectivity operation, a preference mapping, the preference mapping being based upon the plurality of quality parameters associated with the respective aspects of the application, the preference mapping using a preference mapping matrix, the preference mapping matrix comprising a mapping of a plurality of network traffic streams by a plurality of network links, the preference mapping matrix being updated on a recurring basis to reflect updated weighting factors;
identifying, via the intelligent connectivity operation, a best-suited network link for each of the traffic streams, the identifying using the preference mapping matrix; and,
assigning, via the intelligent connectivity operation, each network traffic stream to a particular network link based upon the identifying the best-suited network link for each of the traffic streams.

2. The method of claim 1, wherein:
the plurality of quality parameters comprise quality of service (QoS) parameters.

3. The method of claim 2, wherein:
the preference mapping reflects the QoS parameters for each network stream and QoS capabilities of each available network link.

4. The method of claim 3, wherein:
the QoS capabilities comprise a latency capability, a throughput capability, a reliability capability and a priority capability, the latency capability including end-to-end latency of network traffic transmissions, the throughput capability including a data rate size associated with a particular network link, the reliability capability including an index of reliability metrics, the priority capability including a preference threshold for the particular network link.

5. The method of claim 1, wherein:
the intelligent connectivity operation is performed within a mesh computing environment; and,
the mesh computing environment comprising a plurality of user devices configured to perform peer-to-peer (P2P) communications.

6. The method of claim 5, wherein:
the intelligent connectivity operation performs a QoS network traffic routing operation, the QoS network traffic routing operation managing proportionate sharing QoS capabilities of at least one network link according to a QoS objective of the network traffic stream.

7. A system comprising:
a processor;
a data bus coupled to the processor; and
a non-transitory, computer-readable storage medium embodying computer program code for performing an intelligent connectivity operation, the non-transitory, computer-readable storage medium being coupled to the data bus, the computer program code interacting with a plurality of computer operations and comprising instructions executable by the processor and configured for:
identifying, via the intelligent connectivity operation, a plurality of quality parameters associated with respective network traffic types of an application, each respective network traffic type having an associated traffic stream;
constructing, via the intelligent connectivity operation, a preference mapping, the preference mapping being based upon the plurality of quality parameters associated with the respective aspects of the application, the preference mapping using a preference mapping matrix, the preference mapping matrix comprising a mapping of a plurality of network traffic streams by a plurality of network links, the preference mapping matrix being updated on a recurring basis to reflect updated weighting factors;
identifying, via the intelligent connectivity operation, a best-suited network link for each of the traffic streams, the identifying using the preference mapping matrix; and,
assigning, via the intelligent connectivity operation, each network traffic stream to a particular network link based upon the identifying the best-suited network link for each of the traffic streams.

8. The system of claim 7, wherein:
the plurality of quality parameters comprise quality of service (QoS) parameters.

9. The system of claim 8, wherein:
the preference mapping reflects the QoS parameters for each network stream and QoS capabilities of each available network link.

10. The system of claim 9, wherein:
the QoS capabilities comprise a latency capability, a throughput capability, a reliability capability and a priority capability, the latency capability including end-to-end latency of network traffic transmissions, the throughput capability including a data rate size associated with a particular network link, the reliability capability including an index of reliability metrics, the priority capability including a preference threshold for the particular network link.

11. The system of claim 7, wherein the instructions executable by the processor are further configured for:
the intelligent connectivity operation is performed within a mesh computing environment; and,
the mesh computing environment comprising a plurality of user devices configured to perform peer-to-peer (P2P) communications.

12. The system of claim 11, wherein:
the intelligent connectivity operation performs a QoS network traffic routing operation, the QoS network traffic routing operation managing proportionate sharing QoS capabilities of at least one network link according to a QoS objective of the network traffic stream.

13. A non-transitory, computer-readable storage medium embodying computer program code for performing an intelligent connectivity operation, the computer program code comprising computer executable instructions configured for:
identifying, via the intelligent connectivity operation, a plurality of quality parameters associated with respective network traffic types of an application, each respective network traffic type having an associated traffic stream;

constructing, via the intelligent connectivity operation, a preference mapping, the preference mapping being based upon the plurality of quality parameters associated with the respective aspects of the application, the preference mapping using a preference mapping matrix, the preference mapping matrix comprising a mapping of a plurality of network traffic streams by a plurality of network links, the preference mapping matrix being updated on a recurring basis to reflect updated weighting factors;

identifying, via the intelligent connectivity operation, a best-suited network link for each of the traffic streams, the identifying using the preference mapping matrix; and, assigning, via the intelligent connectivity operation, each network traffic stream to a particular network link based upon the identifying the best-suited network link for each of the traffic streams.

14. The non-transitory, computer-readable storage medium of claim 13, wherein:
the plurality of quality parameters comprise quality of service (QoS) parameters.

15. The non-transitory, computer-readable storage medium of claim 14, wherein:
the preference mapping reflects the QoS parameters for each network stream and QoS capabilities of each available network link.

16. The non-transitory, computer-readable storage medium of claim 15, wherein:
the QoS capabilities comprise a latency capability, a throughput capability, a reliability capability and a priority capability, the latency capability including end-to-end latency of network traffic transmissions, the throughput capability including a data rate size associated with a particular network link, the reliability capability including an index of reliability metrics, the priority capability including a preference threshold for the particular network link.

17. The non-transitory, computer-readable storage medium of claim 13, wherein:
the intelligent connectivity operation is performed within a mesh computing environment; and,
the mesh computing environment comprising a plurality of user devices configured to perform peer-to-peer (P2P) communications.

18. The non-transitory, computer-readable storage medium of claim 17, wherein:
the intelligent connectivity operation performs a QoS network traffic routing operation, the QoS network traffic routing operation managing proportionate sharing QoS capabilities of at least one network link according to a QoS objective of the network traffic stream.

19. The non-transitory, computer-readable storage medium of claim 13, wherein:
the computer executable instructions are deployable to a client system from a computer-readable storage medium of a server system at a remote location.

20. The non-transitory, computer-readable storage medium of claim 13, wherein:
the computer executable instructions are provided from a computer-readable storage medium of a service provider to a user on an on-demand basis.

* * * * *